US012438937B2

(12) United States Patent
Erman et al.

(10) Patent No.: US 12,438,937 B2
(45) Date of Patent: Oct. 7, 2025

(54) CONFIGURING NETWORK SLICES

(71) Applicant: Nokia Solutions and Networks Oy, Espoo (FI)

(72) Inventors: Bilgehan Erman, Weekhawken, NJ (US); Sameerkumar Sharma, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 51 days.

(21) Appl. No.: 17/043,072

(22) PCT Filed: Mar. 29, 2018

(86) PCT No.: PCT/US2018/025158
§ 371 (c)(1),
(2) Date: Sep. 29, 2020

(87) PCT Pub. No.: WO2019/190527
PCT Pub. Date: Oct. 3, 2019

(65) Prior Publication Data
US 2021/0036920 A1    Feb. 4, 2021

(51) Int. Cl.
*H04L 67/10*       (2022.01)
*H04L 41/0816*   (2022.01)
(Continued)

(52) U.S. Cl.
CPC .......... *H04L 67/10* (2013.01); *H04L 41/0816* (2013.01); *H04L 41/0894* (2022.05);
(Continued)

(58) Field of Classification Search
CPC ..... H04L 41/0816; H04L 67/16; H04L 67/34; H04L 67/10; H04L 43/0852; H04L 43/08; H04L 43/16; H04L 41/0806; H04L 41/0893; H04L 67/51; H04L 41/0894; H04L 41/0895; H04L 41/0897; H04L 41/40; H04L 43/20
See application file for complete search history.

(56) References Cited

U.S. PATENT DOCUMENTS

| 11,252,655 | B1 * | 2/2022 | Gupta | H04L 67/02 |
| 2007/0043944 | A1 * | 2/2007 | Okamoto | G06F 21/82 |
| | | | | 713/168 |

(Continued)

OTHER PUBLICATIONS

International Search Report and Written Opinion mailed in corresponding PCT/US2018/025158 on Nov. 8, 2018, 15 pages.
(Continued)

*Primary Examiner* — Michael Won
(74) *Attorney, Agent, or Firm* — Tong, Rea, Bentley & Kim, LLC

(57) ABSTRACT

Aspects described herein relate to various methods, systems and apparatuses that can be used to define a network slice based on descriptions of the computing functions involved in a network service, and to configure the network slice using resources that are associated with the descriptions. For example, a network slice may be defined based on whether the network service requires tunneling or data encryption. The network slice may be configured using resources that perform those tunneling and data encryption functions.

12 Claims, 14 Drawing Sheets

(51) Int. Cl.
   *H04L 41/0894* (2022.01)
   *H04L 41/0895* (2022.01)
   *H04L 41/0897* (2022.01)
   *H04L 41/40* (2022.01)
   *H04L 43/20* (2022.01)
   *H04L 67/51* (2022.01)
   *H04L 43/08* (2022.01)

(52) U.S. Cl.
   CPC ...... *H04L 41/0895* (2022.05); *H04L 41/0897* (2022.05); *H04L 41/40* (2022.05); *H04L 43/20* (2022.05); *H04L 67/51* (2022.05); *H04L 43/08* (2013.01)

(56) References Cited

U.S. PATENT DOCUMENTS

| | | | |
|---|---|---|---|
| 2016/0156513 A1* | 6/2016 | Zhang | H04L 67/10 709/220 |
| 2016/0353367 A1 | 12/2016 | Vrzic et al. | |
| 2017/0054595 A1* | 2/2017 | Zhang | H04L 41/0896 |
| 2017/0070892 A1 | 3/2017 | Song et al. | |
| 2017/0104609 A1* | 4/2017 | McNamee | H04L 63/06 |
| 2017/0208139 A1* | 7/2017 | Li | H04W 4/70 |
| 2017/0300990 A1* | 10/2017 | Tanaka | G10L 15/08 |
| 2018/0041436 A1* | 2/2018 | Zhang | H04W 40/00 |
| 2018/0077024 A1* | 3/2018 | Zhang | H04L 63/0272 |
| 2018/0132138 A1* | 5/2018 | Senarath | H04L 47/78 |
| 2018/0316779 A1* | 11/2018 | Dowlatkhah | H04W 24/02 |
| 2018/0316799 A1* | 11/2018 | Shaw | H04L 41/0806 |
| 2020/0076709 A1* | 3/2020 | Stenberg | H04W 24/02 |
| 2020/0106680 A1* | 4/2020 | Chen | H04L 41/5003 |

OTHER PUBLICATIONS

ETSI, "Network Functions Virtualisation (NFV); Architectural Framework," ETSI GS NFV 002 v1.2.1, Dec. 2014, 21 pages.

Doll et al., "5G Novel Radio Multiservice adaptive network Architecture (5G NORMA) Deliverable D4.2 RAN architecture components—final report," Jun. 30, 2017, 158 pages.

ETSI, "Network Functions Virtualisation (NFV); Management and Orchestration; VNF Packaging Specification," GS NFV-IFA 011, V2.1.1, France, dated Oct. 2016, 53 pages.

3GPP, "3rd Generation Partnership Project; Technical Specification Group Services and System Aspects; System Architecture for the 5G System," Stage 2, Release 15, 3GPP TS 23.501, V15.0.0, Technical Specification, France; dated Dec. 2017, 181 pages.

ETSI, "Network Functions Virtualisation (NFV); Virtual Network Functions Architecture," GS NFV-SWA 001, V1.1.1, France, dated Dec. 2014, 93 pages.

* cited by examiner

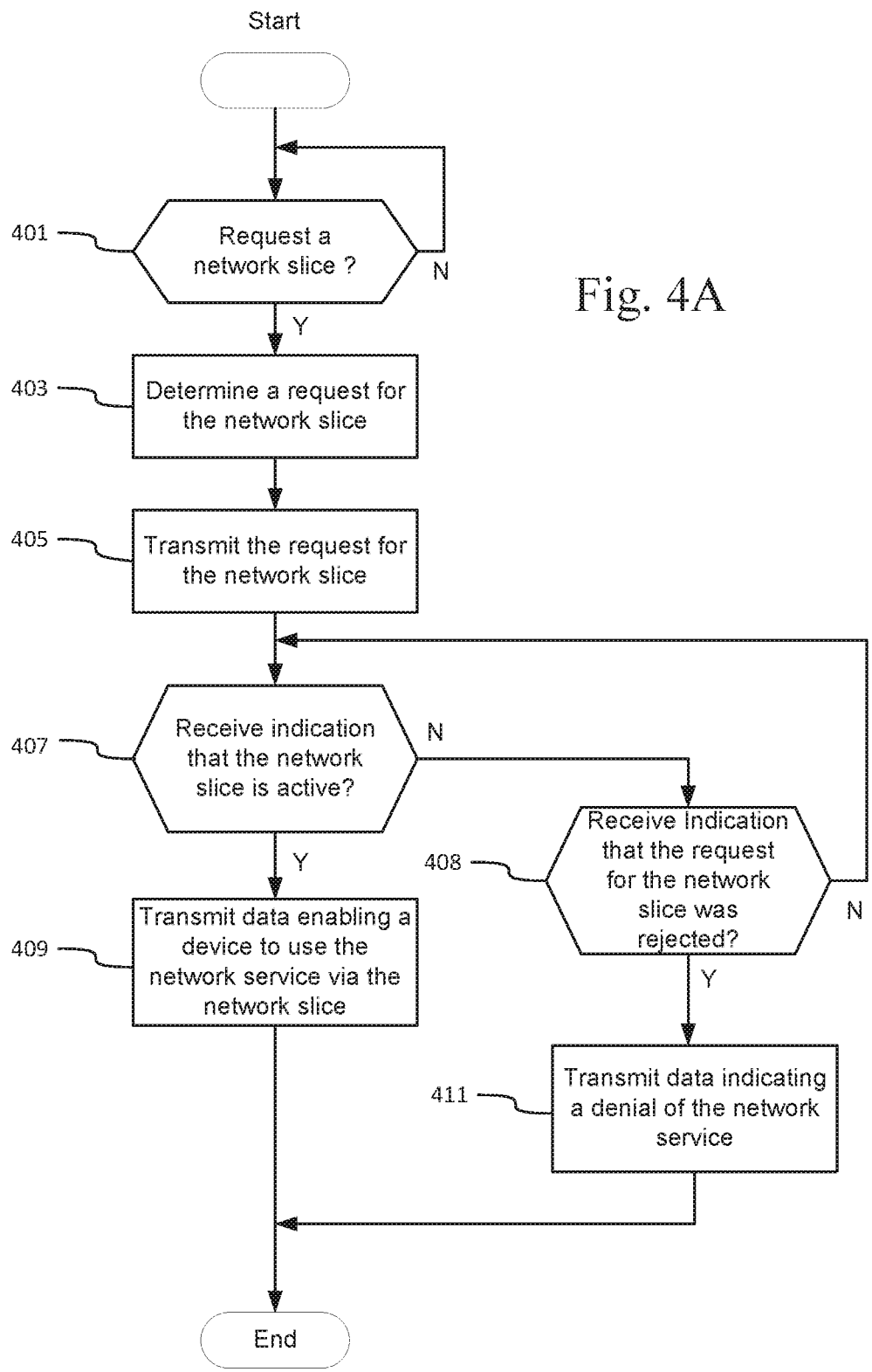

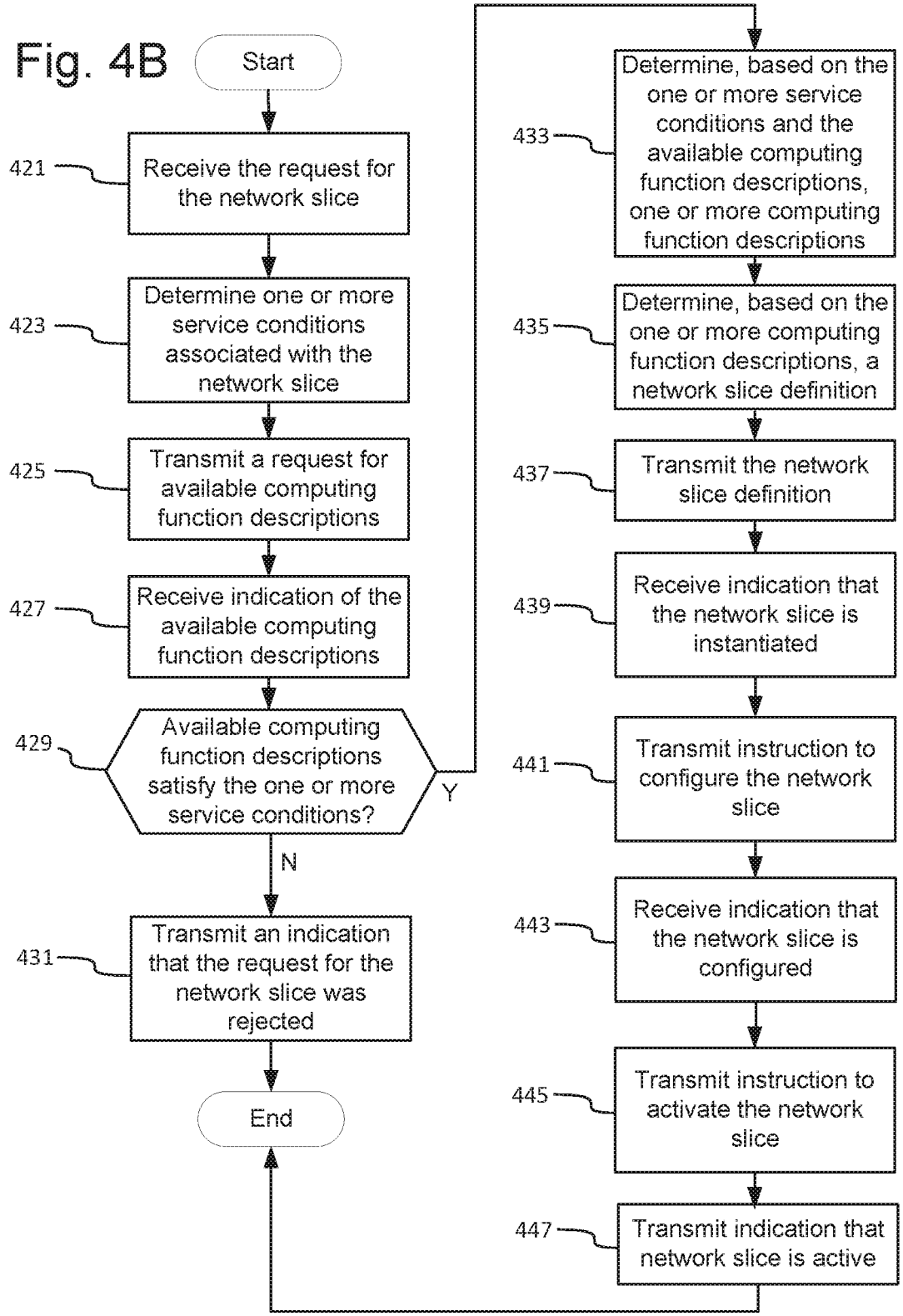

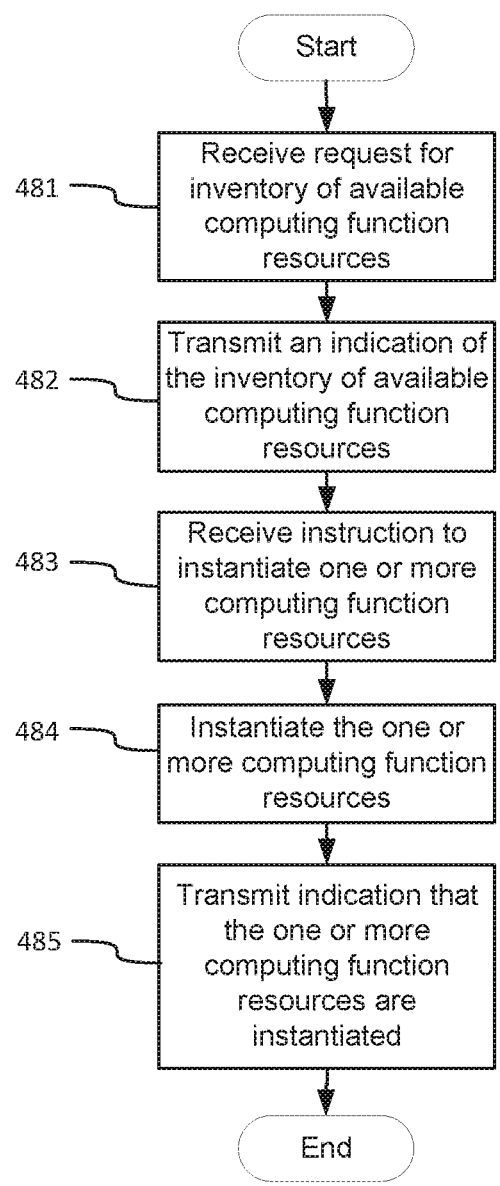

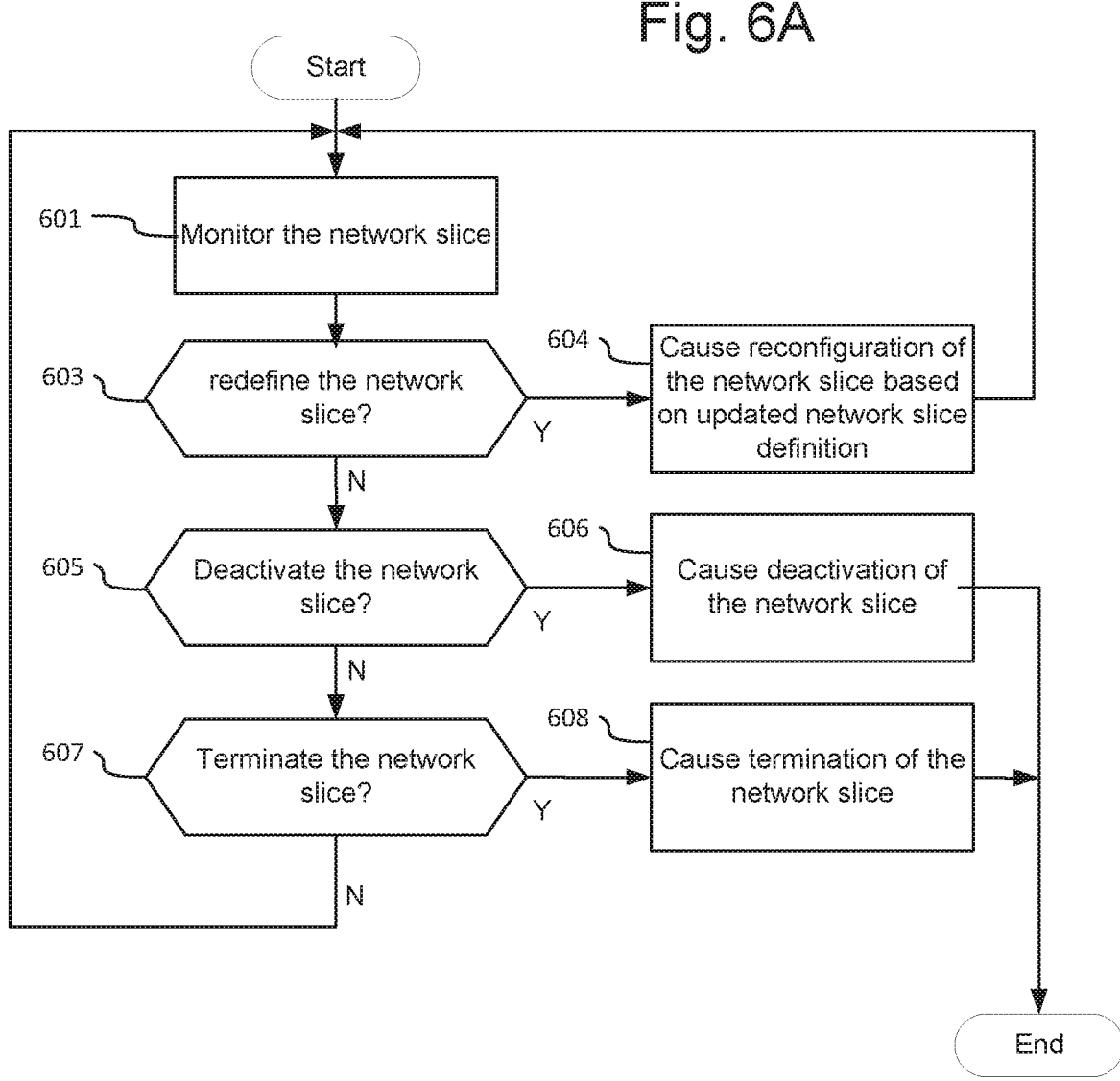

CONFIGURING NETWORK SLICES

CROSS-REFERENCE TO RELATED APPLICATIONS

The present application is a 371 application of PCT Patent Application Serial No. PCT/US2018/025158, entitled "CONFIGURING NETWORK SLICES", and filed on Mar. 29, 2018, the entirety of which is incorporated by reference herein.

BACKGROUND

One or more network slices may be created over a network infrastructure and may be built using virtual resources. Data may be processed and/or transmitted to one or more user devices via the resources of those network slices. Each of the network slices may have capabilities to handle different conditions related to the data processing and/or data transmissions that may be performed. In view of the varied and numerous conditions that a network slice may need to handle, existing, and often manual, systems and methods for managing and configuring a network slice have often been ineffective or difficult to implement.

BRIEF SUMMARY

This summary is provided to introduce a selection of concepts in a simplified form that are further described below in the Detailed Description. This Summary is not intended to identify key features or essential features of the various embodiments, nor is it intended to be used to limit the scope of the claims.

Aspects described herein relate to various methods, systems and apparatuses that can be used to define a network slice based on descriptions of the computing functions involved in the network service, and to configure the network slice using resources that are associated with the descriptions. For example, a network slice may be defined based on whether the network service requires tunneling or data encryption. The network slice may be configured using resources that perform those tunneling and data encryption functions.

In some variations, one or more computing devices may receive a request for a network service. The one or more computing devices may determine one or more service conditions associated with the network service. The one or more computing devices may determine, based on the one or more service conditions, one or more computing function definitions from available computing function definitions. The one or more computing devices may determine, based on the one or more computing function definitions, a network slice definition. The network slice definition may indicate that the network slice will be configured based on at least a first computing function definition of the one or more computing function definitions. The one or more computing devices may determine, based on the network slice definition and data that associates computing function definitions to computing function resources, one or more computing function resources. The one or more computing devices may determine configuration data that is usable to configure the one or more computing function resources. The one or more computing devices may cause, based on the configuration data, configuration of the one or more computing function resources to enable performance of a function associated with the one or more computing function resources. One or more computing resources may execute, as part of performing the network service via the network slice, the function associated with the one or more computing function resources

BRIEF DESCRIPTION OF THE DRAWINGS

Some example embodiments are illustrated by way of example and not limited in the accompanying figures in which like reference numerals indicate similar elements and in which:

FIGS. 4A-4F provide example methods that may be performed by a system for configuring a network slice.

FIGS. 6A and 6B provide example methods for managing a network slice and one or more computing function resources after configuration of the network slice.

DETAILED DESCRIPTION

In the following description of various illustrative embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1:
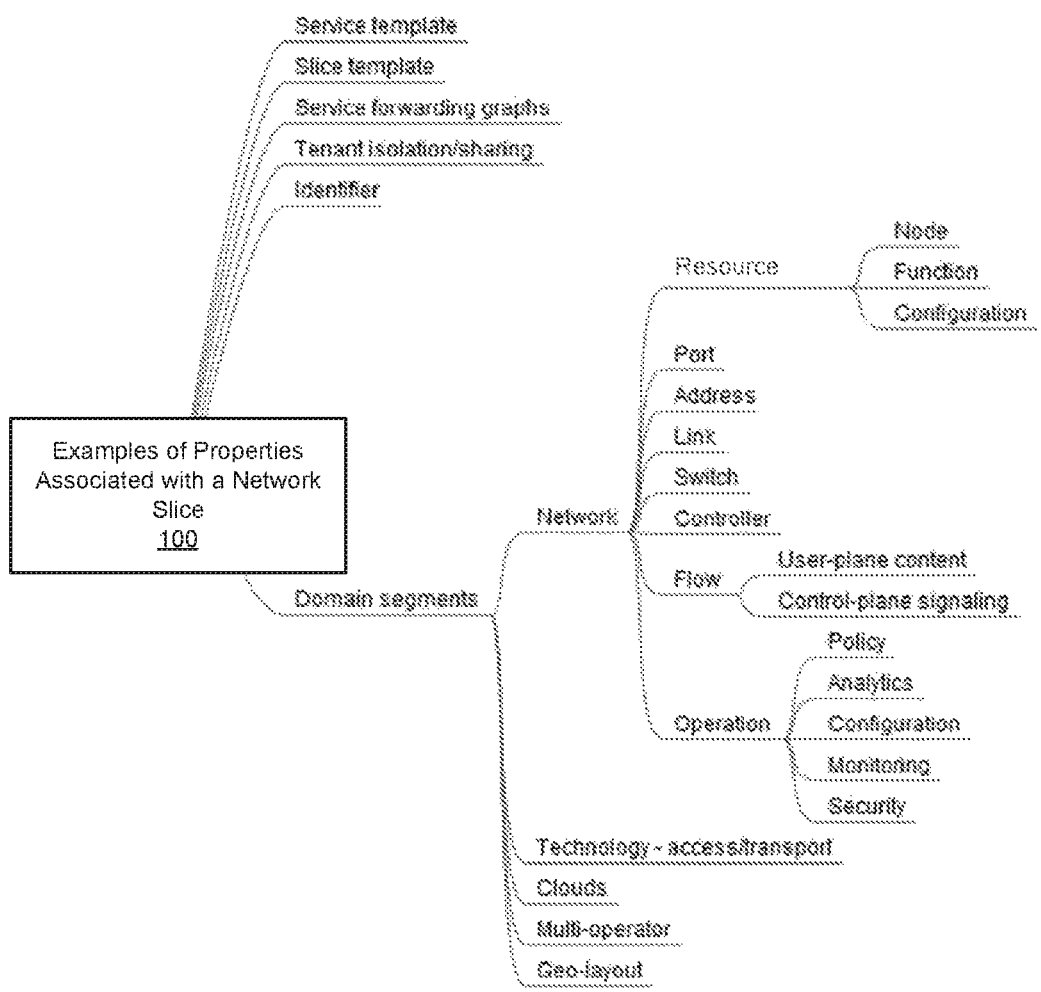
FIG. 1 shows examples of properties associated with a network slice.

Network slicing allows for multiple logical networks to be created on top of a common shared physical infrastructure of computing resources. In some variations, network slicing may allow for varying degrees of specialization that improves network performance. There are, however, complexities involved in designing a system for configuring network slices. For example, FIG. 1 shows examples of properties associated with a network slice. In particular, FIG. 1 shows, via the sections labeled "network" and "resource", some of the possible network and resource properties associated with a network slice. It is possible to define a network slice at the level of these individual network or resource properties. For example, a network slice could be defined based on if an Evolved Node B (eNodeB) resource is needed to perform the network service, if a mobile management entity (MME) resource is needed to perform the network service, if a Home Subscriber Server (HSS) resource is needed to perform the network service, if a serving gateway (S-GW) resource is needed to perform the network service, or if a base transceiver station (BTS) resource is needed to perform the network service. Defining a network slice at this level may provide some benefits. Indeed, defining a network slice at a level of individual network or resource properties—such as eNodeB or a selected subset of eNodeB functions—may allow for highly dedicated and specialized network slices. Additionally, in some instances, defining a network slice at the level of individual network or resource properties may be beneficial to autonomous or dynamic systems that operate at certain, often smaller, time scales.

Defining a network slice at the individual network or resource property, however, also has drawbacks. In particular, not every network service that involves eNodeB is the same. For example, in some instances, a first network service may require low latency and allow for unsecure data communications. In other instances, a second network service may require secure data communications but may be unconcerned with network latency. Thus, while eNodeB may form the basis for configuring the network slice, further configuration may be required based on the specific network service. Additionally, if the network slice is defined at a level of selected eNodeB functions, there may be additional computational overhead in managing the network slices.

This disclosure discusses various methods, systems and apparatuses that can be used to define a network slice based on descriptions of the computing functions involved in the network service, and to configure the network slice using resources that are associated with the descriptions. There may not be a one-to-one association between the functions and resources. In some variations, the methods, systems and apparatuses described herein may be used to configure network slices autonomously or dynamically. Further, in some variations, the methods, systems and apparatuses described herein may be used to provide an abstraction between a network slice definition and the actual implementation of the computing resources.

For example, a network slice could be defined by functional descriptions that satisfy one or more conditions for performing the network service. As one particular example, the network service may involve the transportation of sensitive data over a radio access network (RAN). Thus, the network slice may be defined to include a computing function description for encrypting or a computing function description for a specific type of encryption. There are many different types of functional descriptions that may define a network slice including, for example, a computing function description for a threshold of network latency. Being able to define a network slice at this level (e.g., based on a functional description of the network service's data flow) may provide benefits. Indeed, the determination of what is included in a network slice and the subsequent management of the network slice may be simplified. These and other benefits will be apparent based on the discussion of this disclosure.

Figure 2:
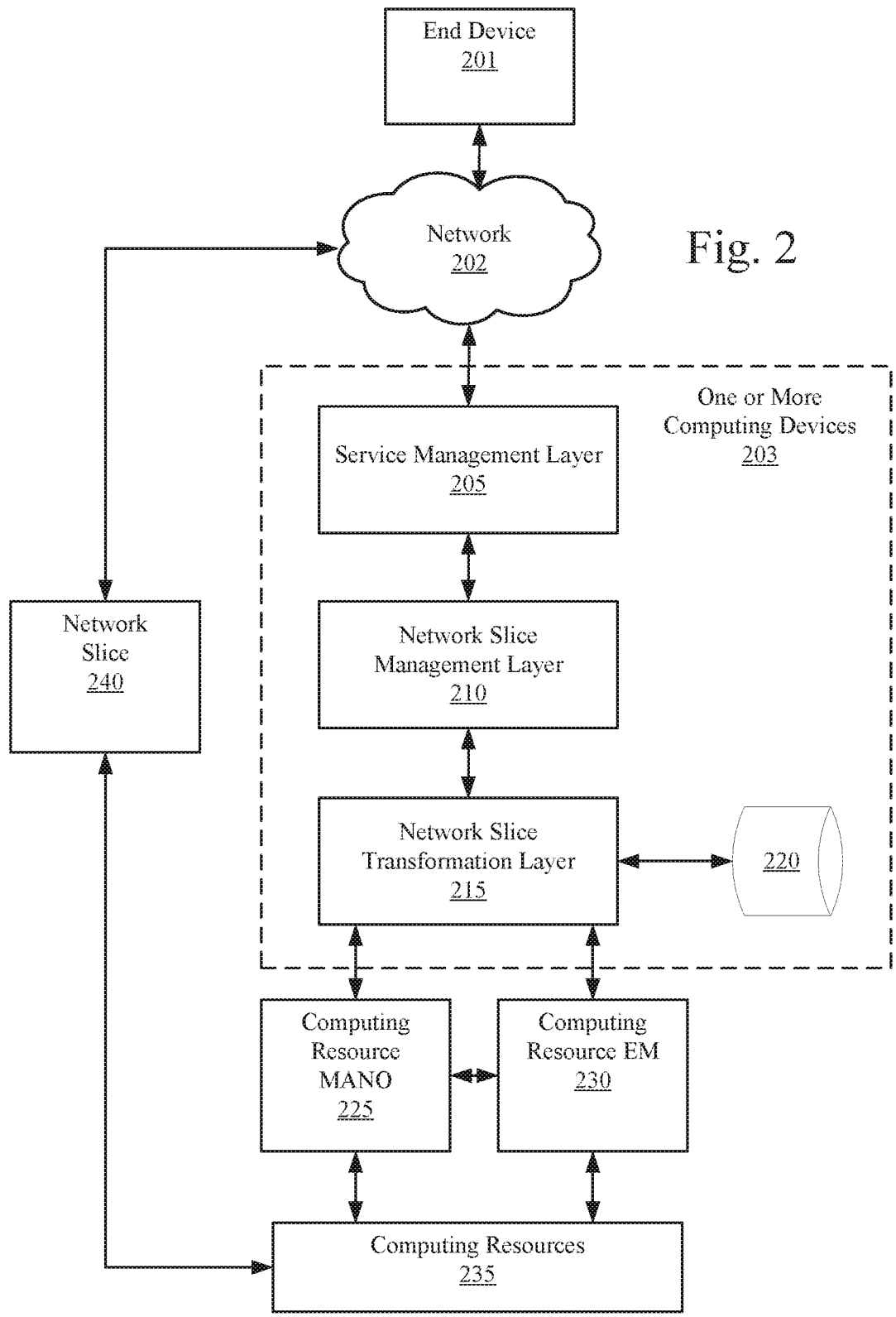
FIG. 2 shows an example block diagram of a system for configuring a network slice.

FIG. 2 shows an example block diagram of a system for configuring a network slice. As shown in FIG. 2, end device 201 may use various network services by transmitting and receiving data via network 202. The end device 201 may be user equipment, a station capable of communicating via a RAN, or some other device that uses a network service. Further, the end device 201 may be associated with an end-user (e.g., a personal computer or personal cell phone) or may be associated with an enterprise (e.g., a server or other computing device of an industrial site, corporation, or other enterprise). The end user and/or the enterprise may have a business relationship with a service provider that operates network 202.

At least one network service may be provided via a network slice 240. The network slice 240 may be configured to use one or more computing resources from computing resources 235. The computing resources 235 may include virtual computing resources and physical computing resources (e.g., a computing device). As some examples, the computing resources 235 may include one or more of the following: a virtual machine; a container; a microservice, a blade server, or the like. The one or more computing resources used by the network slice 240 may be configured to operate as a specialized resource. For example, in some instances, a computing resource (e.g., a virtual machine) may be configured as an eNodeB and may provide various functions of an eNodeB as part of performing the network service.

One or more computing devices 203 may be configured to determine a network slice definition for the network slice 240 and, based on the network slice definition, determine configuration data for configuring the network slice 240 onto the computing resources. The configuration data may, in some variations, be communicated to a computing resource management and operation (MANO) 225 and/or a computing resource element manager (EM) 230. A computing resource MANO 225 may be configured to manage and orchestrate the computing resources and any other infrastructure element including, for example, the management and orchestration of physical computing resources, networking resources, storage resources and virtual computing resources. A computing resource EM 230 may be configured to communicate directly with the computing resources 235 and/or any other infrastructure element. The computing resource EM 230 may be configured to, based on direct communications with the physical resources, configure those physical resources and/or activate a physical resource once appropriately configured.

The one or more computing devices 203 may be configured to perform the determinations of the network slice definition and the configuration data based on three different layers: service management layer 205, network slice management layer 210, and network slice transformation layer 215. In some variations, these layers serve to separate the management of the network slices from the underlying computing resources. This separation may allow for the network slice management layer 210 to be unaware of what specific types of computing resources (e.g., virtual machines, physical machines, etc.) or computing function resources (e.g., eNodeB, HSS, MME, BTS, etc.) are configured or otherwise used for the network slice 240. Instead, the network slice transformation layer 215 may determine configuration data and may cause the configuration of the computing resources based on the configuration data. After being configured, the computing resources may be capable of operating as specific computing function resources. For example, based on the configuration data, a virtual computing resource or a physical computing resource from the computing resources 235 may be configured to perform functions of or otherwise operate as an eNodeB, an HSS, an MME, a BTS, or the like.

The service management layer 205 may be configured to determine a request for a network slice based on certain network activity and transmit the request to the network slice management layer 210. For example, the service management layer 205 may determine a request for a network slice based on receiving a request for a content-based network service (e.g., video network service, audio network service, virtual reality network service) that was transmitted by the end device 201. As another example, the service management layer 205 may determine a request for a network slice based on network usage. In one such example, the service management layer 205 may determine one or more traffic spikes in the network 202 have occurred and request a network slice in an attempt to dedicate resources to a type of traffic or a geographic region that is causing the traffic spike. As yet another example, the service management layer 205 may determine a request for a network service based on receiving a command from an operator. For example, an operator of network 202 may cause the service management layer 205 to receive a command that indicates a network slice is to be configured for a particular network service (e.g., a microwave backhaul service for a RAN).

The network slice management layer 210 may be configured to determine a network slice definition based on one or more service conditions and available computing function descriptions. The one or more service conditions may be determined based on the request for the network slice or the network service. As some examples, a service condition may indicate a type of data encryption, a type of tunneling, or a threshold of network latency. Each of the available computing function descriptions may include the various types of computing functions that can be configured based on the currently available computing resources. For example, the available computing function descriptions may include descriptions for the various types of tunneling, encryption, policy enforcement, data analytics, data schedulers (e.g., a video scheduler), network latency, and other functions that are currently available. The network slice transformation layer 215 may be configured to send the available computing function descriptions to the network slice management layer 210 upon request.

In addition to determining the network slice definition, the network slice management layer 210 may manage, control or otherwise have access to the service forwarding graphs for network slices, the quality of experience (QoE) for network slices, the monitoring of network slices, and other utilization management tasks for network slices.

The network slice transformation layer 215 may receive the network slice definition. Based on the network slice definition and data associations stored in database 220, the network slice transformation layer 215 may determine one or more computing function resources. Each of the computing function resources may indicate a specialized resource including, for example, eNodeB, HSS, MME, BTS, or the like. From the one or more computing function resources, the network slice transformation layer 215 may determine configuration data that is usable to configure one of the computing resource 235 as the specialized resource (e.g., perform functions of eNodeB, HSS, MME, BTS, or the like). The configuration data determination may be based on the network slice definition and information indicating the configuration parameters for each computing function resource. The information indicating the configuration parameters for each computing function resource may be stored in database 220. The data associations and the information indicating the configuration parameters may form a part of a knowledge base for mapping the computing function descriptions to specific computing function resources and configuration data.

The data associations in database 220 may include data that associates computing function definitions to computing function resources. For example, if the computing function definition is for data encryption, the data may include an entry for the data encryption and, associated with that entry, is a listing of computing function resources that support the data encryption (e.g., the entry associates the data encryption with an eNodeB manufactured by NOKIA that supports the data encryption). The entry may also include a listing of computing function resources that do not support the data encryption (e.g., the entry associates the data encryption with an eNodeB from a particular manufacturer that does not support the data encryption).

In addition to determining the configuration data, the network slice transformation layer 215 may manage, control or otherwise have access to the validation of the computing function resources, lifecycle management for the computing function resources, discovery of available computing function resources, and the determination of the available computing function definitions.

Figure 3A:
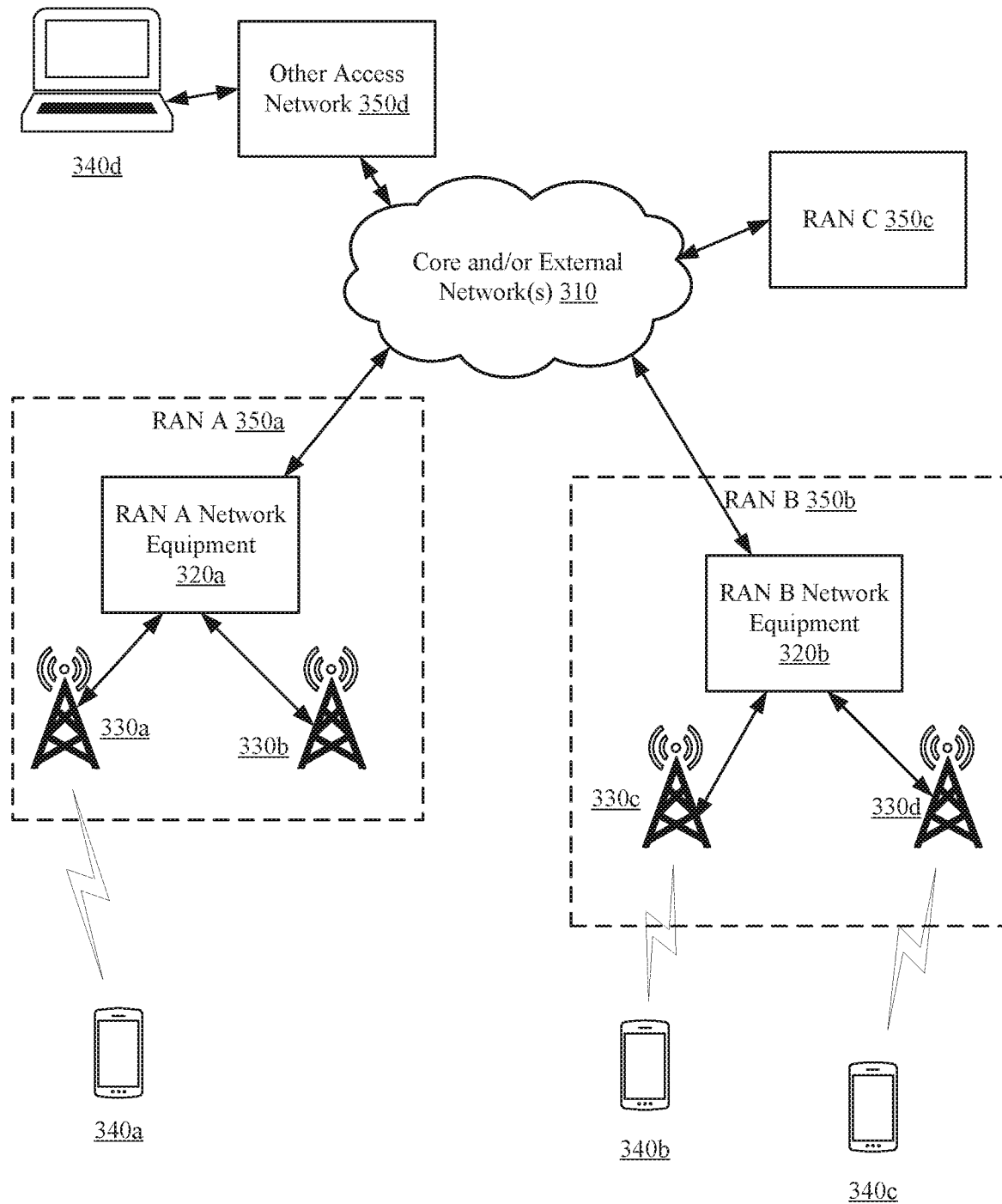
FIGS. 3A and 3B show an example network environment that may include a system for configuring a network slice.
Figure 3B:
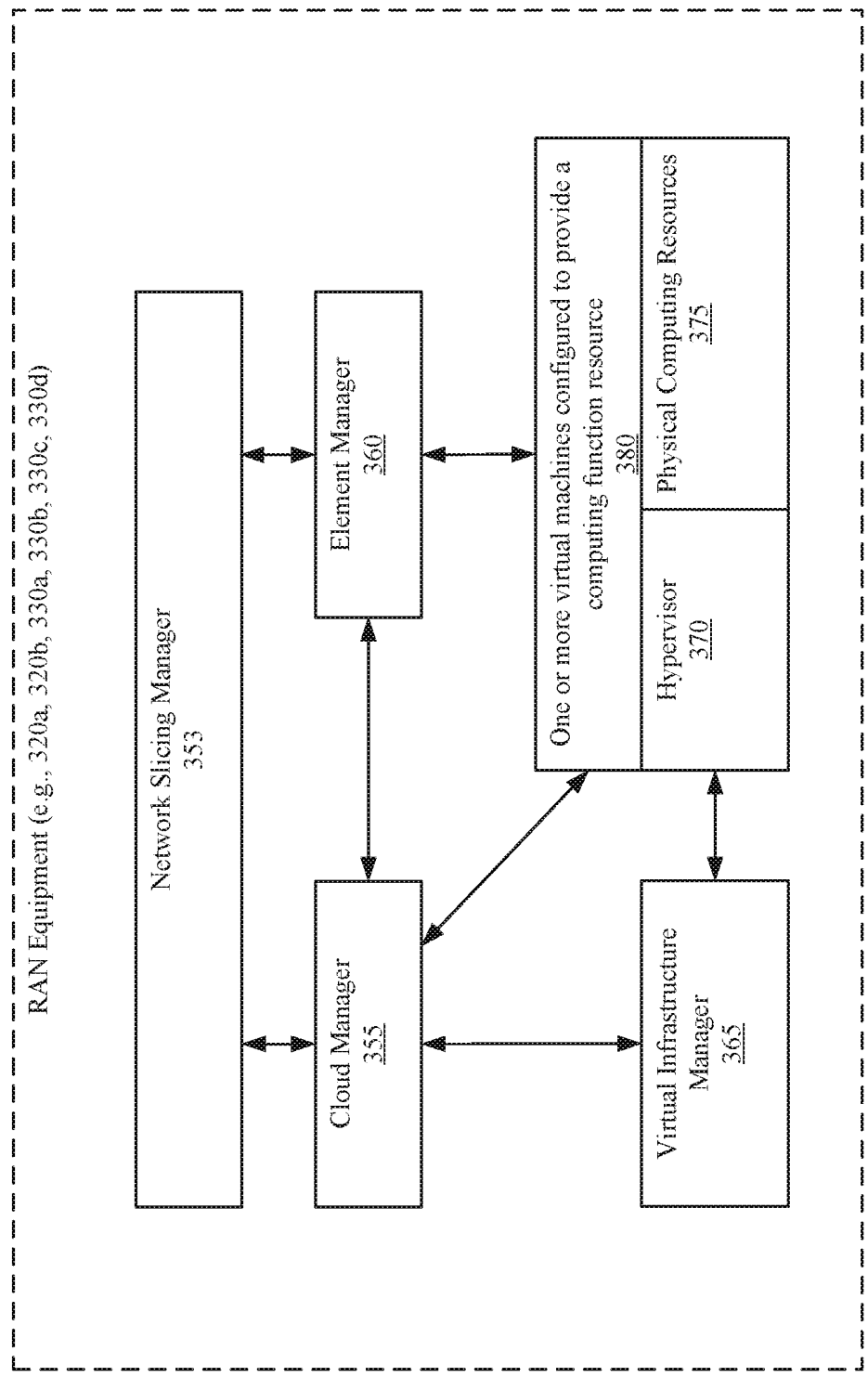

The above discussion regarding FIG. 2 provides a brief introduction to the examples and various features described throughout this disclosure. Additional details on the above aspects, as well as further aspects, will be discussed below in the remaining figures. In particular FIGS. 3A and 3B show an example operating environment that includes one or more RANs and may be suitable for use as a cellular mobile network. Although various portions of this disclosure provide details regarding an operating environment for one or more RANs or a cellular mobile network, the various aspects described herein are equally applicable to other technology specific sub-network domains, such as the optical transport network.

FIGS. 3A and 3B show an example network environment that may include a system for configuring a network slice. In particular, FIG. 3A illustrates a network environment including user equipment connected via one or more RANs and other networks and in which network slices may be configured. FIG. 3B illustrates example RAN equipment that may include a system for configuring a network slice.

As shown in FIG. 3A, a station (STA) may connect to other STAs via one or more access networks 350 (e.g., 4G LTE access networks or 5G access networks), which in turn may be connected to each other via one or more core and/or external networks 310. The STA may use a network service. The network service may cause data to be routed through one or more RANs and to the user equipment. The data may be routed over the one or more RANs via a network slice.

The one or more RANs (e.g., 350a, 350b, 350c) may include various equipment such as access points 330 (e.g., 330a, 330b, 330c, 330d) and network equipment 320 (e.g., 320a, 320b). Access points 330 may be configured to communicate wirelessly with user equipment 340. The access points 330 may include base stations and/or nodes that enable wireless communications with user equipment 340 according to wireless standards (e.g., 3G, 4G, 5G, or other such wireless standards). Such nodes of the access points 330 may provide scheduler functionality, traffic management functionality, and other RAN resource management functionality. The access points 330 may include network slicing functionality, as will be discussed below in connection with FIG. 3B The network equipment 320 may be configured to provide additional RAN functionality. For example, network equipment 320 may implement radio network controller functionality for controlling an access point 330 to communicate with user equipment 340. Additionally or alternatively, the network equipment 320 may include network slicing functionality, as will be discussed below in connection with FIG. 3B. In some variations, some or all functions of the network equipment 320 may be implemented by nodes and/or base stations of the access points 330.

The STAs may include, as shown, smartphones (e.g., 340a-c) and/or personal computers (e.g., 340d) and/or any other type of user equipment. For example, user equipment may include tablets, desktop computers, laptop computers, gaming devices, virtual reality (VR) headsets, or any other mobile device or other fixed device having a wireless interface capable of communicating with an access point 330.

The network service, as one of its features, may provide a content-related data flow that, via the network slice, is routed over the RANs and to the user equipment. The content-related data flows may include bidirectional video data flows associated with data traffic from a conversational video application (e.g., SKYPE, FACETIME, etc.) or other types of multimedia data flows that are latency-sensitive. Such latency-sensitive multimedia data flows may further include bidirectional audio (e.g., audio chat), bidirectional VR video, unidirectional audio/video/VR, and other such multimedia data flows.

The content-related data flows may be bidirectional data flows (e.g., a conversational video between user equipment 340a and user equipment 340b) and/or may involve a plurality of user equipment (e.g., a video conference involving user equipment 340a, user equipment 340b, and user equipment 340c). Such data flows involving multiple user equipment may involve multiple bidirectional data flows between each pair of user equipment (e.g., a first bidirectional data flow between user equipment 340a and user equipment 340b, and second bidirectional data flow between user equipment 340b and user equipment 340c, and a third bidirectional data flow between user equipment 340a and user equipment 340c), or may involve bidirectional data flows between each user equipment and a central server. Bidirectional data flows as described herein may thus occur between user equipment and other endpoints (e.g., servers). All of these data flows may be routed, via the network slice, over one or more of the access networks 350 and the core and/or external network(s) 310.

As illustrated in FIG. 3A, some STAs may connect via other access networks 350d that may not be a RAN. Although the concepts described below are often described with respect to a radio access network, it should be understood that the principles described herein may be used in any type of access network.

While each STA is shown as communicating with one AP 330 in FIG. 3A, the STAs may communicate with multiple APs 330 connected to the same network or multiple networks. Also, network may include additional networks that are interlinked so as to provide further internetworked communications. Such networks may include one or more private or public packet-switched networks, for example the internet, one or more private or public circuit-switched networks, for example a public switched telephone network, a satellite network, one or more wireless local area networks (e.g., 802.11 networks), one or more metropolitan area networks (e.g., 802.16 networks), and/or one or more cellular networks configured to facilitate communications to and from the STAs through one or more APs 330. In various embodiments, a STA may perform the functions of an AP for other STAs.

Orthogonal frequency division multiplexing access (OFDMA) may be used for multiplexing wireless devices for uplink and/or downlink data transmissions. In OFDMA systems, a frequency spectrum is divided into a plurality of closely spaced narrowband orthogonal subcarriers. The subcarriers are then divided into mutually exclusive groups called subbands, with each subband (also referred to as subchannels) assigned to one wireless device or multiple wireless devices. According to various aspects, subcarriers may be assigned to different wireless devices. OFDMA has been adopted in synchronous and cellular systems, including 4G broadband wireless standards (e.g. Long-Term Evolution (LTE)), 5G wireless standards (e.g., New Radio (NR)), and IEEE 802.16 family standards. Out of an abundance of caution, this discussion of OFDMA is only one example of the different types of technologies over which network slices could be configured. As one example, aspects described herein could be used to configure a network slice over an optical transport network.

As mentioned above, the access points 330 and the network equipment 320 may include network slicing functionality. FIG. 3B shows one example block diagram for providing the network slicing functionality. In particular, FIG. 3B shows a block diagram that provides network slicing functionality using virtual computing resources (e.g., virtual machines and/or containers). Thus, FIG. 3B shows a network slicing manager 353; a cloud manager 355; an element manager 360 (e.g., NOKIA NetAct); a virtual infrastructure manager 365; a hypervisor 370; and physical computing resources 375. The network slicing manager 353 may be configured similar to the one or more computing devices 203. The cloud manager 355 may be configured similar to the computing resource MANO 225. The element manager 360 may be configured similar to the computing resource EM 230. The virtual infrastructure manager 365, the hypervisor 370 and the physical computing resources 375 may be similar to the computing resource 235.

Based on one or more data communications routed over the one or more access networks, a network slice may be configured using the components illustrated in FIG. 3B. Indeed, as shown in FIG. 3B, one or more virtual machines 380 may be executing on the physical computing resources 375. The one or more virtual machines 380 may be providing a computing function resource for a network service associated with one of the access networks, core network or external networks of FIG. 3A. For example, the network service may be a network service that facilitates the wireless communication between a STA 340 and one of the RANs, and the one or more virtual machines may be providing functions of a BTS. Thus, based on the arrangement shown in FIG. 3B, any of the access points and/or network equipment 320 may be routing, over one of the RANs, data for the network service via a network slice.

FIGS. 4A-4F provide example methods that may be performed by a system for configuring a network slice. The various methods may be performed by the different components and devices discussed above in connection with FIGS. 2, 3A and 3B. For example, the example method of FIG. 4A may be performed by one or more computing devices configured to provide the service management layer 205. The example method of FIG. 4B may be performed by one or more computing devices configured to provide the network slice management layer 210. The example method of FIG. 4C may be performed by one or more computing devices configured to provide the network slice transformation layer 215. The example method of FIG. 4D may be performed by one or more computing devices configured to operate as the computing resource MANO 225. The example method of FIG. 4E may be performed by one or more computing devices configured to operate as the computing resource EM 230. The example method of FIG. 4F may be performed by one or more of the computing resources 235. For simplicity, each of the example methods shown in FIGS. 4A-4E will be discussed in terms of being performed by one or more computing devices and FIG. 4F will be discussed in terms of being performed by a computing resource. However, a specific layer, computing resource MANO, computing resource EM, or computing resource will be mentioned if it is the source or destination of a transmission.

As mentioned above, the example method of FIG. 4A may be performed by one or more computing devices configured to provide the service management layer 205. At step 401 of FIG. 4A, one or more computing devices may determine whether to request a network slice. This determination may be based on one or more data transmissions routed over a network (e.g., an access network 350 or network 202). For example, an end device (e.g., end device 201, which may be associated with an end user or an enterprise) may transmit a request for a particular network service (e.g., a content-based service, such as QoE assured mobile device video streaming) and, upon receipt of the request, the one or more computing devices may determine to request a network slice for the network service. An end device may transmit a command that indicates a network slice is to be configured for a particular network service (e.g., microwave backhaul service for a RAN) and, upon receipt of the command, the one or more computing device may determine to request a network slice for the network service.

In a general sense, there are nearly unlimited types of network services that could be hypothetically requested or commanded by an end device. The exact types of network services will depend on the capabilities of the network infrastructure and/or the types of network services that have been preconfigured by an operator of the network infrastructure and made available to users of the network infrastructure. As some non-limited examples, the network service may be for a service that provides the secure routing of traffic for an enterprise network (e.g., a corporate entity's private network); a service that provides supplemental data to attendees at an event (e.g., supplemental data related to a sports event or concert being attended by users of mobile devices); a service that provides low-latency cloud computing functions; or a service that provides a video service and additional video analytics.

As another example, the one or more computing devices may perform the determination of step 401 based on a process that monitors the status of the network infrastructure. For example, the one or more computing devices may receive an indication that one or more traffic spikes have occurred in the network infrastructure. Based on the traffic spikes, the one or more computing devices may determine to request a network slice to provide RAN-based services (e.g., allocate another BTS) to the areas affected by the traffic spikes.

If the one or more computing devices determines not to request the network slice, the method may proceed to loop until at step 401 until a network slice is needed. If the one or more computing devices determines to request the network slice, the method may proceed to step 403.

At step 403, the one or more computing devices may determine a request for the network slice. The request for the network slice may indicate information about any network service associated with the network slice (e.g., by including an identifier for each network service in the request). For example, if the network slice is associated with an end-to-end service, the request may include information about two or more network services (e.g., a first service for a RAN, and a second service for the core network). The request for the network slice may include information indicating the end device (or some other device that will use the network service). The request may include an indication of one or more characteristics of the service including, for example, whether a particular level of latency is required, whether the service relates to a mobile broadband service or an internet of things (IoT) service, and the like.

At step 405, the one or more computing devices may transmit the request for the network service. This request may be transmitted to the network slice management layer.

Steps 407 and 408 may represent a loop for waiting on the network slice management layer to respond to the request transmitted at step 405. At step 407, the one or more computing devices may determine whether an indication that the network slice is active has been received. If the indication has been received, the method may proceed to step 409. If the indication has not been received, the method may proceed to step 408.

At step 408, the one or more computing devices may determine whether an indication that the request for the network slice was rejected has been received. If the indication has been received, the method may proceed to step 411. If the indication has not been received, the method may proceed to back to step 407 to continue waiting on a response to the request transmitted at step 405.

At step 409, the one or more computing devices may transmit data enabling a device to use the network service via the network slice. For example, the data may include network information for accessing the network slice such as, for example, a network slice identifier. In some instances, the transmission at step 409 may be sent to the end device that sent the request or command received in connection with step 401.

At step 411, the one or more computing devices may transmit data indicating a denial of the network service. In some instances, the transmission at step 411 may be sent to the end device that sent the request or command received in connection with step 401.

As mentioned above, the example method of FIG. 4B may be performed by one or more computing devices configured to provide the network slice management layer 210. At step 421 of FIG. 4B, the one or more computing devices may receive the request for the network slice. This request may have been transmitted by the service management layer at step 405 of FIG. 4A.

At step 423, the one or more computing devices may, based on the request for the network slice, determine one or more service conditions associated with the network slice. This determination may be performed based on the data of the request and/or other data sources. For example, the request may include an identifier of one or more network services associated with the network slice. Based on these identifiers, the one or more computing devices may search a database that associates each identifiers to a set of service conditions. As another example, based on the request, the one or more computing devices may determine a type of data (e.g., video, audio) or type of network service (e.g., virtual reality service, low-latency video service). The one or more computing devices may also determine an account associated with the end device (or a device expected to use the service). The account may be associated with a profile indicating the various QoE levels available to the account (e.g., an indication that this account is enrolled in low-latency video services; an indication that this account is enrolled in secure data communications). Based on the type of data, the type of network service and/or the various QoE levels available to the account, the one or more computing devices may determine one or more service conditions.

In a general sense, there are nearly unlimited types of service conditions that could be hypothetically determined. The exact types of service conditions will depend on the capabilities of the network infrastructure and/or the types of service conditions that have been preconfigured by an operator of the network infrastructure. As some non-limited examples, the service conditions may indicate a maximum or threshold of latency, a type of data being processed (e.g., audio or video), one or more indications of data security (e.g., a type of encryption, a type of tunneling), one or more indications of a mobile broadband resource, one or more indications of an IoT resource, or the like.

At step 425, the one or more computing devices may transmit a request for available computing function descriptions. This request may be transmitted to the network slice transformation layer In some arrangements, the order of steps 423 and 425 may be reversed. In other arrangements, step 425 may be performed as a separate, parallel, process.

At step 427, the one or more computing devices may receive an indication of the available computing function descriptions. The indication of the available computing function descriptions may have been transmitted by the network slice transformation layer as a response to or based on the request transmitted at step 425. The indication of the available computing function descriptions may include a copy of the available computing function descriptions, or a location where the available computing function descriptions can be accessed. The available computing function descriptions may include a list of functions or capabilities that the available computing resources are expected to support for network slices. For example, the list may include an entry for supported data encryption protocols, for supported thresholds of latencies, for supported tunneling techniques, for supported thresholds of QoE, for supported types of mobility management (e.g., LTE Mobility Management), and the like.

Steps 429 and 433 are discussed in terms of the indication received at step 427 including a copy of the available computing function descriptions or a location where the available computing function descriptions are accessible. However, in some instances, instead of a copy or a location, the indication received at step 427 may indicate there was no change to the available computing function descriptions. In this case, the one or more computing devices may use a previously-received copy of the available computing descriptions or may use a previously-received location to access the available computing descriptions.

At step 429, the one or more computing devices may determine whether the available computing function definitions satisfy the one or more service conditions. This determination may be performed by comparing each of the one or more service conditions to the available computing function descriptions and determining whether there is at least one function description in the available computing function descriptions that matches or satisfies a service condition. For example, if a service condition is a network latency and the available computing function descriptions include a list of functions and capabilities, there would need to be an entry in the list that indicates a supported threshold of latency that is greater than or equal to the network latency of the service condition. If a service condition is a data encryption protocol, there would need to be an entry in the list that indicates a supported encryption protocol that matches or provides greater security than the data encryption protocol of the service condition. If every service condition is satisfied by the available computing function definitions, the one or more computing devices may proceed to step 433. If at least one service condition is not satisfied by the available computing function definitions, the method may proceed to step 431.

At step 431, the one or more computing devices may transmit an indication that the request for the network slice was rejected. This indication may be transmitted to the service management layer.

At step 433, the one or more computing devices may determine, based on the one or more service conditions and the available computing function descriptions, one or more computing function descriptions. The one or more computing function descriptions may be those from the available computing function descriptions that satisfied the one or more service conditions. If multiple function descriptions satisfied the one or more service conditions, one of the multiple function descriptions may be selected based on a heuristic. For example, the selection may be based on which entry from the list of functions or capabilities that most exceeds the service condition (e.g., if the service condition is a network latency, the entry for the lowest latency may be selected). As another example, the heuristic may also base the selection on current network conditions (e.g., if the service condition is a network latency, the entry that is a match or a closest match to the network latency may be selected).

At step 435, the one or more computing devices may determine, based on the one or more computing function descriptions, a network slice definition. The network slice definition may include the one or more computing function descriptions, virtual link information that indicates connectivity between the computing function descriptions, and a service forwarding graph. For example, if the network service is for a virtual reality video service over a RAN, the network slice definition may include computing function definitions that indicate a RAN scheduler for low-latency and video data flow processing, virtual link information that indicates how the computing function definition for the virtual reality processing connects to the computing function definition for the RAN scheduler, and a service forwarding graph that indicates one or more data paths through the computing function definition for the virtual reality processing and the computing function definition for the RAN scheduler. In some variations, the network slice definition may be formatted according to or based on a version of ETSI Network Service Description (NSD), other industry-standard data model definition, or proprietary data model definition.

As one example, the network service may be for a web server service. In one or more instances, the network slice definition may include a gateway, a proxy, a load-balancer, and one or more servers. The network slice definition may include an indication that the gateway provides a connection to an end-device and that the gateway, the proxy, the load-balancer, and one or more servers are interconnected in various ways.

At step 437, the one or more computing devices may transmit the network slice definition. The network slice definition may be transmitted to the network slice transformation layer.

At step 439, the one or more computing devices may receive an indication that the network slice is instantiated. This indication may have been transmitted by the network slice transformation layer as a response to or based on the transmission of the network slice definition that occurred at step 437.

At step 441, the one or more computing devices may transmit an instruction to configure the network slice. This instruction may be transmitted to the network slice transformation layer.

At step 443, the one or more computing devices may receive an indication that the network slice is configured. This indication may have been transmitted by the network slice transformation layer as a response to or based on the transmission of the network slice definition that occurred at step 441.

At step 445, the one or more computing devices may transmit an instruction to activate the network slice. This instruction may be transmitted to the network slice transformation layer.

At step 447, the one or more computing devices may transmit an indication that the network slice is active. This indication may be transmitted to the service management layer as a response to or based on the request received at step 421.

As mentioned above, the example method of FIG. 4C may be performed by one or more computing devices configured to provide the network slice transformation layer 215. At step 451 of FIG. 4C, the one or more computing devices may receive the request for available computing descriptions. This request may have been transmitted by the network slice management layer at step 425.

At step 453, the one or more computing devices may determine the available computing function descriptions. In some variations, the available computing function descriptions may include a list of functions or capabilities that the available computing resources are expected to perform for network slices. This list may include an entry for each function or capability that is expected to be supported. For example, the list may include entries for supported data encryption protocols, for supported thresholds of latencies, for supported tunneling techniques, for supported thresholds of QoE, for supported types of mobility management (e.g., LTE Mobility Management), and the like.

The one or more computing devices may determine the available computing function descriptions based on an inventory of the available computing function resources. The inventory of the available computing function resources may be requested and received from the computing resource MANO. The inventory of the available computing function resources may indicate one or more specialized resources or other software products that can be configured on the computing resources. Examples of the specialized resources or other software products include eNodeB, BTS, HSS, S-GW, and the like. Additionally, the inventory may include, for each specialized resource or software product, a type of computing resource. For example, if the eNodeB is available for execution by a virtual machine or container, the inventory may indicate an association between the eNodeB and the virtual machine. In some variations, the determination of which type of computing function resource to instantiate may be performed by a device that manages the computing resources, such as the MANO. Further, the inventory may include multiple different entries for a specialized resource or software product. For example, if an eNodeB is available for execution by both a virtual machine and a physical computing resource, the inventory may include a first entry for a first eNodeB and the virtual machine and a second entry for the second eNodeB and the physical computing resource. As another example, if two eNodeB resources are available but are manufactured by different sources, the inventory may include a first entry for a first eNodeB that is manufactured by a first source (e.g., NOKIA) and a second entry for a second eNodeB that is manufactured by a second source (e.g., ERICSSON).

In some variations, the one or more computing devices may determine whether the inventory of the available computing function resources has changed. To perform this determination, the one or more computing devices may compare the inventory to a previous version of the inventory. For example, the inventory may have changed if the inventory includes an entry for a new specialized resource or software product, or if a previously-available specialized resource or software product is no longer included in the inventory. If the inventory has changed, the method may proceed to determine the available computing function descriptions. If the inventory has not changed, the method may proceed to step 455 to transmit an indication of the available computing function descriptions that indicates there was no change to the available computing function descriptions.

If the inventory has changed, the one or more computing devices may map each indicated specialized resource or software product into one or more function descriptions. For example, if the inventory indicates that an MME resource is available, a function description may be determined for each function that can be performed by the MME including, for example, LTE Mobility Management. In some variations, this mapping may be performed based on the data that associates the computing function descriptions to the computing function resources, which is discussed in connection with step 459, or any other information stored in the knowledge base, which is discussed in connection with steps 459 and 461.

As one example, the inventory may include an Apache2 HTTP server. The entry for the Apache2 HTTP server may map into function descriptions that reflect the capabilities of the Apache2 HTTP server including, for example, one or more descriptions for access authentication, one or more descriptions for secure HTTP communications, one or more descriptions for virtual hosting, one or more descriptions for a gateway interface, one or more descriptions for server-side includes, one or more descriptions for an administration console, one or more descriptions for a supported version of Internet Protocol, and others.

At step 455, the one or more computing devices may transmit an indication of the available computing function descriptions. This indication may be transmitted to the network slice management layer. Further, this indication may include a copy of the available computing function descriptions, a location where the available computing function descriptions are accessible, or an indication that there was no change to the available computing function descriptions.

At step 457, the one or more computing devices may receive a network slice definition. This network slice definition may have been transmitted by the network slice management layer at step 437.

At step 459, the one or more computing devices may determine, based on the network slice definition and data that associates computing function definitions to computing function resources, one or more computing function resources. These data that associates computing function definitions to computing function resources may be stored in a database (e.g., database 220). Additionally, as will be discussed in connection with step 459, this determination may be based on further information. For example, the available computing function descriptions and/or the inventory of the available computing function resources of may be used as a basis for this determination. Further, one or more computing resource constraints and one or more policy rules may be used as a basis for this determination. The one or more computing resource constraints and the one or more policy rules may be stored in the database (e.g., database 220). The data associations between the computing function definitions to computing function resources, one or more computing resource constraints and the one or more policy rules may be a part of a knowledge base for mapping the computing function descriptions to specific computing function resources and configuration data. The knowledge base may be created by manual processes (e.g., via a data entry process), by automatic processes (e.g., a deterministic algorithm or a machine learning technique), or a combination thereof.

The data that associates computing function definitions to computing function resources may include a description of how each function definition is mapped to a particular computing function resource. For example, the data may indicate that a function description for LTE Mobility Management maps to a computing function resource for an MME. The data may also include a description of how virtual links for the computing function descriptions are mapped to links between the computing function resources. Using this mapping process, the network slice definition may be used to determine one or more computing function resources that will be configured for the network slice.

In some instances, the data may indicate that a function description maps to multiple computing function resources. In such instances, additional information may be used to select one of the potential computing function resources. For example, the data may indicate that a function description maps to multiple different resources for eNodeB (e.g., an eNodeB as manufactured by NOKIA; an eNodeB as manufactured by ERICSSON, an eNodeB that is executed by a virtual computing resource; an eNodeB that is executed by a physical computing resource, etc.). To select one of the resources for eNodeB, the one or more computing devices may compare each of the resources for eNodeB to one or more criteria from the network slice definition, the available computing function descriptions, the inventory of available computing function resources, the one or more computing resource constraints, and/or the one or more policy rules.

As one example of the various selections that may be performed when multiple resources for eNodeB are determined, the one or more computing devices may continue mapping additional computing function descriptions to computing function resources. If additional resources for eNodeB are found by these subsequent mappings, the additional eNodeB resources may be compared to the original multiple resources for eNodeB. A common resource may be determined based on the comparison (e.g., an eNodeB as manufactured by NOKIA was common to each function description that mapped to at least one resource for eNodeB), and the common resource for eNodeB may be selected.

As another example of the various selections that may be performed when multiple resources for eNodeB are determined, the one or more computing devices may continue mapping additional computing function descriptions to computing function resources. One of the mappings may indicate additional function descriptions that, in turn, may indicate that certain resources for eNodeB should not be used for the function description (e.g., a resource for eNodeB may not support a particular type of data encryption). Based on this indication, this resource for eNodeB may be removed from the multiple resources for eNodeB or otherwise not selected.

As another example of the various selections that may be performed when multiple resources for eNodeB are determined, the one or more computing devices may select one of the resources for eNodeB based on a policy rule. For example, a policy rule may specify that virtual computing resources have priority over physical computing resources. Thus, if the multiple resources for eNodeB includes an eNodeB for execution by a virtual computing resource (e.g., a virtual machine, a container, etc.), that resource may be selected. As another example, a policy rule may, for a particular function description (e.g., a threshold latency), prioritize certain computing resources over other resources (e.g., physical computing resources should be used over virtual computing resources). Thus, one of the multiple resources for eNodeB may be selected based on the priority of the policy rule.

As yet another example of the various selections that may be performed when multiple resources for eNodeB are determined, the one or more computing devices may select one of the resources for eNodeB based on the service forwarding graph of the network slice definition. For example, the service forwarding graph may indicate a particular resource for eNodeB and the resource for eNodeB that matches the indication of the service forwarding graph may be selected.

Additionally, as part of determining the one or more computing resources, the one or more computing devices may perform a validity determination based on the forwarding graph of the network slice definition, the one or more policy rules and/or the one or more computing resource constraints. For example, a computing resource constraint may indicate that a first computing function resource has a dependency on a second computing function resource. The mapping, however, may have only determined the first computing function resource. Based on the dependency, the second computing function resource may be added to the one or more computing function resources.

At step 461, the one or more computing devices may determine configuration data for configuring the one or more computing function resources. This determination may be based on the network slice definition and information indicating the configuration parameters for each computing function resource. The information indicating the configuration parameters may include an ordered list. Each entry of the ordered list may include a name of a parameter, a value of a parameter, and a process for how the parameter is set (e.g., an indication that the Representational State Transfer (REST) API is used to set the parameter). The information indicating the configuration parameters for each computing function resource may be stored in a database (e.g., database 220). Further, the information indicating the configuration parameters may be included as part of the knowledge base.

The configuration data may include may include a template for each of the one or more computing function resources and one or more executable scripts. Each template may include a description of resource allocations in the computing resources or other infrastructure elements (e.g., allocate a virtual machine for an eNodeB). In particular, the description may include allocations of compute nodes, virtual links, and the like. Each template may comply with or be similar to a version of ETSI Network Service Resource (NSR) specification. An example of a template is provided below.

An executable script may be a self-contained set of code that configures the various parameters of a computing function resource. An executable script may, for example, be a Linux shell script, a Python module, or one or more REST API operations. Additionally, the executable script may be configured to set the one or more parameters of the computing function resource to certain values in accordance with an order specified by the ordered list. As one example, an executable script may be for configuring an Apache2 web server and, in one or more instances, may include a command that would set the ServerName variable to a particular value.

Based on the configuration data, the one or more computing devices may proceed to cause configuration of the one or more computing function resources to enable performance of the various functions associated with the one or more computing function resources. Indeed, the one or more computing devices may, based on the configuration data, cause the allocation, instantiation and/or configuration of a virtual or physical computing resource to operate as one of the computing function resources. For example, a virtual machine may be allocated, instantiated and/or configured to operate as an eNodeB and, thus, upon execution may perform one or more functions associated with an eNodeB. Steps 463-479 provide an example of the one or more computing devices causing configuration of the one or more computing function resources.

At step 463, the one or more computing devices may transmit an instruction to instantiate the one or more computing function resources. This instruction may be transmitted to the computing resource MANO. Additionally, this instruction may include or be based on one or more templates from the configuration data.

At step 465, the one or more computing devices may receive an indication that the one or more computing function resources are instantiated. This indication may have been received from the computing resource MANO.

At step 467, the one or more computing devices transmit an indication that the network slice is instantiated. This indication may be transmitted to the network slice management layer.

At step 469, the one or more computing devices may receive an instruction to configure the network slice. This indication may have been transmitted by the network slice management layer at step 441 of FIG. 4B.

At step 471, the one or more computing devices may transmit one or more instructions to configure the one or more computing function resources. Each of these instructions may be transmitted to the computing resource EM or, in some variations, directly to one or more computing resources. Additionally, each instruction may include or be based on a template from the configuration data.

At step 473, the one or more computing devices may receive one or more indications that the one or more computing function resources are configured. Each of these indications may have been transmitted from the computing resource EM or, in some variations, directly from the one or more computing resources.

At step 475, the one or more computing devices may transmit an indication that the network slice is configured. This indication may be transmitted to the network slice management layer.

At step 477, the one or more computing devices may receive an instruction to activate the network slice. This indication may have been transmitted by the network slice management layer at step 445 of FIG. 4B.

At step 479, the one or more computing devices may transmit one or more instructions to activate the one or more computing function resources. These instructions may be transmitted to the computing resource EM or, in some variations, directly to the computing resources. Additionally, each of these instructions may include an executable script from the configuration data, and each of these instructions may cause execution of the executable script.

As mentioned above, the example method of FIG. 4D may be performed by one or more computing devices configured to operate as the computing resource MANO 225. At step 481 of FIG. 4D, the one or more computing devices may receive a request for an inventory of the available computing function resources. This request may have been transmitted by the network slice transformation layer at step 453 of FIG. 4C and as part of determining the available computing function descriptions.

The one or more computing devices may, as part of the MANO operations, keep an up-to-date inventory of the available computing function resources. Accordingly, as a response to the request received at step 481, the one or more computing devices may transmit an indication of the inventory of the available computing function resources. This indication may include a copy of the inventory or a location where the inventory is accessible.

At step 483, the one or more computing devices may receive an instruction to instantiate the one or more computing function resources. This instruction may have been transmitted by the network slice transformation layer at step 463 of FIG. 4C.

At step 484, the one or more computing devices may instantiate the one or more computing function resources. Such instantiation may include performing one or more operations of a MANO to allocate, instantiate and otherwise enable management of the one or more computing function resources. The operations performed may be based on the templates of the configuration data.

At step 485, the one or more computing devices may transmit an indication that the one or more computing function resources are instantiated. This indication may be transmitted to the network slice transformation layer.

As mentioned above, the example method of FIG. 4E may be performed by one or more computing devices configured to operate as the computing resource EM 230. At step 486 of FIG. 4E, the one or more computing devices may receive one or more instructions to configure the one or more computing function resources. The one or more instructions may have been transmitted by the network slice transformation layer at step 471.

At step 487, the one or more computing devices may configure the one or more computing function resources to an initial state. Such configuration may include establishing connections to other computing function resources, establishing an initial or default configuration for the computing function resources, and the like. The operations performed to configure the one or more computing function resources may be based on the templates of the configuration data.

At step 488, the one or more computing devices may transmit an indication that the one or more computing function resources are configured. This indication may be transmitted to the network slice transformation layer.

At step 489, the one or more computing devices may receive one or more instructions to activate the one or more computing function resources. These instructions may have been transmitted from the network slice transformation layer at step 479. Additionally, these instructions may include one or more executable scripts from the configuration data.

At step 490, the one or more computing devices may activate the one or more computing function resources to enable performance of the network service. Activation may include executing the one or more executable scripts to establish an updated configuration for the one or more computing function resources and performing any other operation necessary to enable the one or more computing function resources to perform the associated functions. Upon successful activation, the one or more computing function resources are available to perform various functions as part of performing the network service.

Figure 4C:
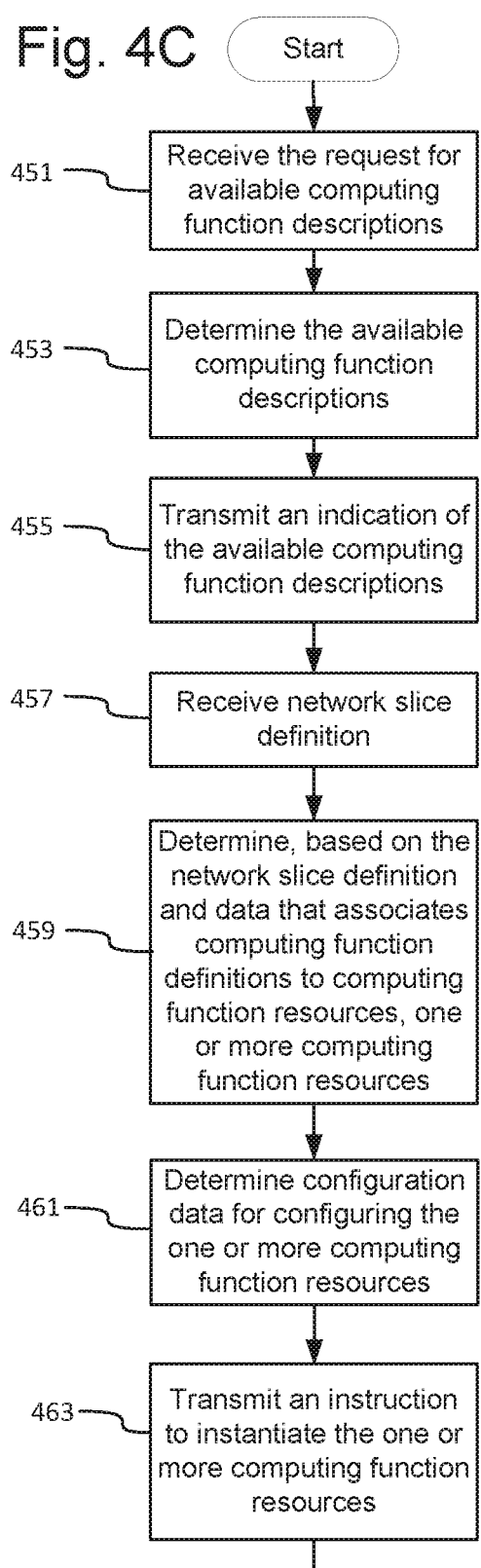
Figure 4C:
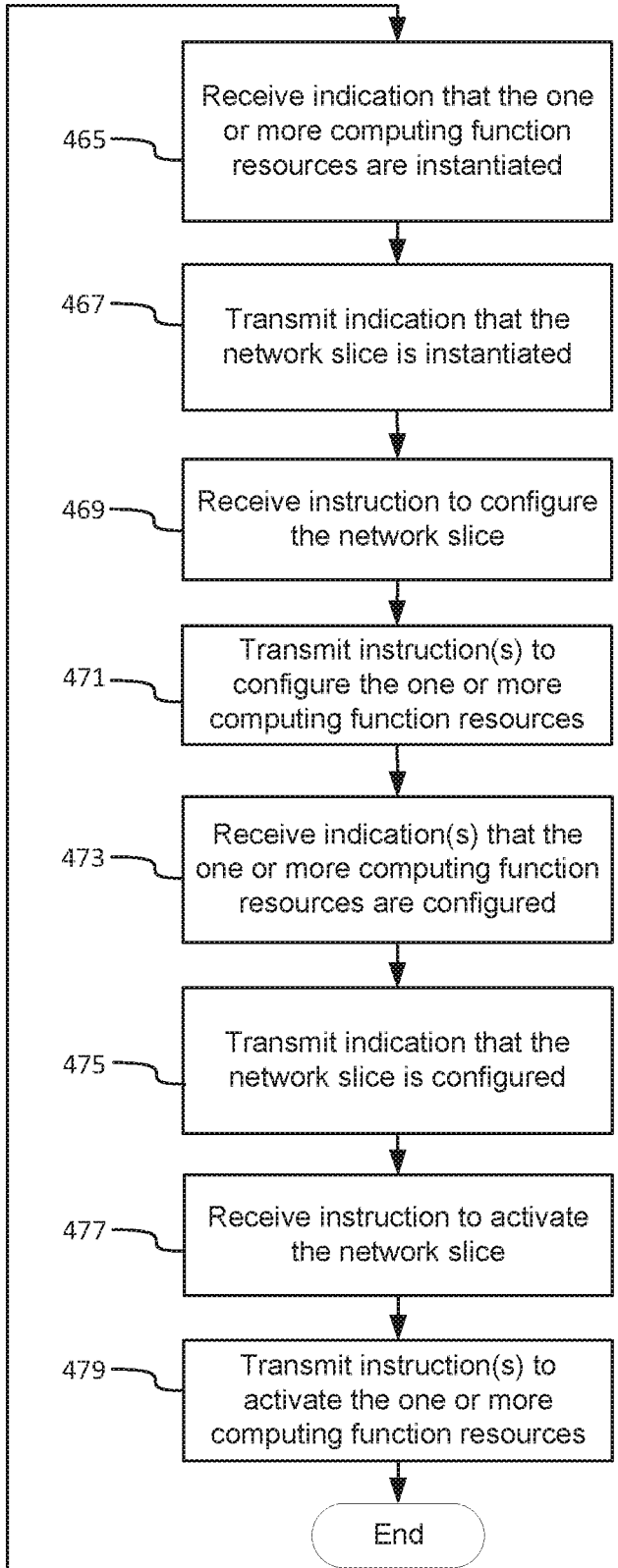
Figure 4E:
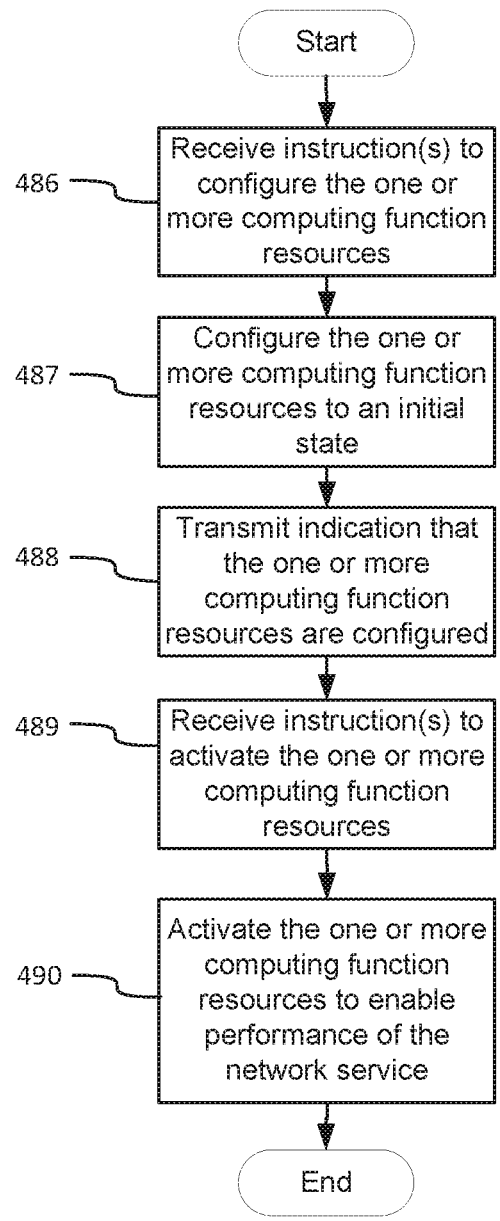
Figure 4F:
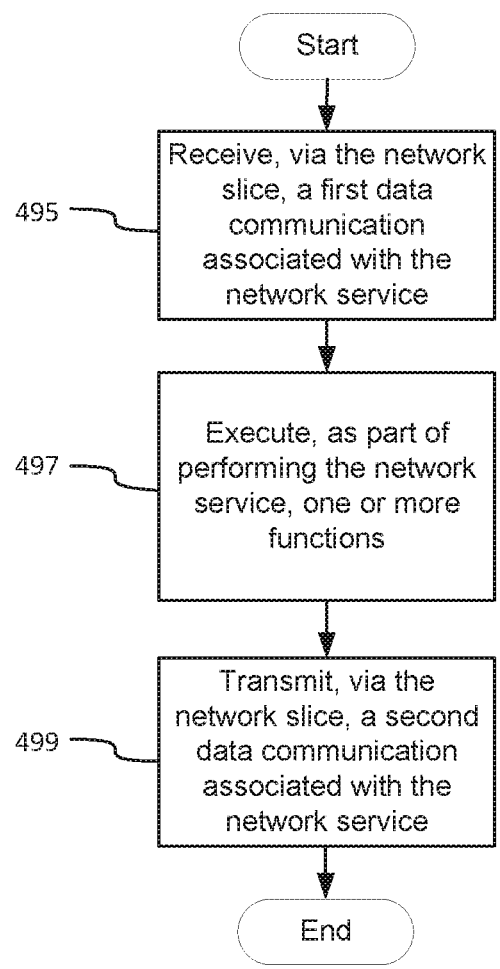

As mentioned above, the example method of FIG. 4F may be performed by one or more of the computing resources 235. In particular, the example method of FIG. 4F represents what may occur after activation of one of the computing resources 235. As mentioned above, after activation, the computing resource may be available to perform various functions as part of performing the network service. The example method of FIG. 4F shows a few example steps that may be performed as part of performing the network service.

At step 495, the computing resource may receive, via the network slice, a first data communication associated with the network service. The first data communication may have been transmitted by an end device over a RAN (e.g., end device 201 and RAN 350a). The data included in the second data communication may depend on the type of network service. For example, if the network service is a content-based network service, the data communication may include a request for video or other content item.

At step 497, the computing resource may execute, as part of performing the network service, one or more functions associated with the computing function resource. The one or more functions may include, for example, processing the data communication received at step 495 and determining response data based on the data communication. The one or more functions may include, for example, a function of the configured type of computing function resource (e.g., a function of an eNodeB, a function of an BTS, a function of an HSS, a function of an S-GW, a function of an MME, etc.). The various processes performed by execution of the one or more functions may depend on the type of network service. For example, if the network service is a content-based network service, the one or more functions may include the generating or processing of video, audio, or other multimedia data. The functions may also include performing communications between the various computing function resources for the network slice.

At step 499, the computing resource may transmit, via the network slice, a second data communication associated with the network service. The second data communication may be transmitted to an end device via a RAN (e.g., end device 202 and RAN 350). The data included in the second data communication may depend on the type of network service. For example, if the network service is a content-based network service, the second data communication may include video, audio or other multimedia data.

Depending on the type of network service some of the steps shown in FIG. 4F may not be performed. For example, if the network service is a data push service, there may not be any data communications received as shown at step 495. Further, depending on the type of network service, additional steps may be performed. For example, some network services may cause a data communication to be transmitted via another network (e.g., not the network slice).

Figure 5:
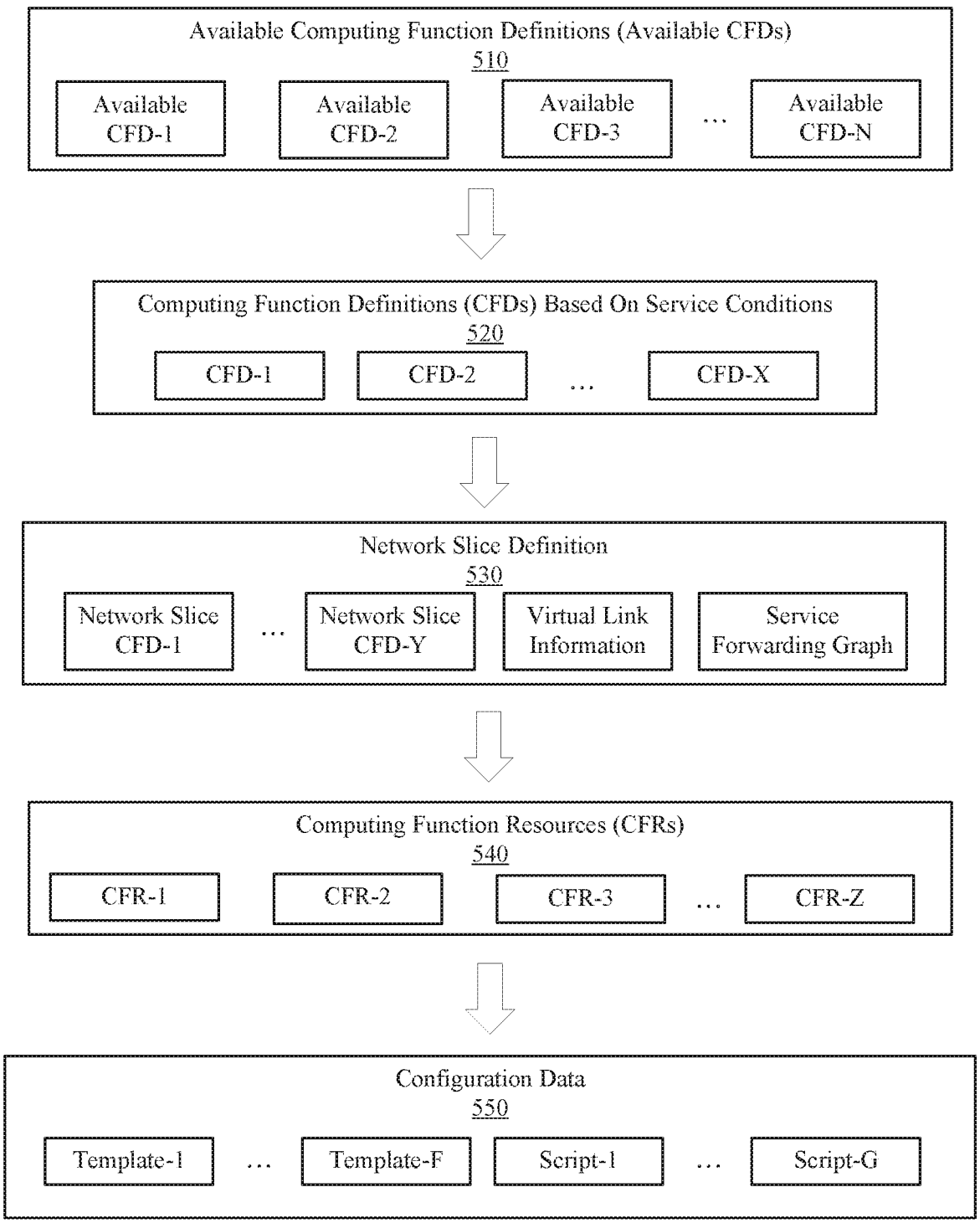
FIG. 5 shows an example of data transformation flow performed by a system for configuring a network slice.

As is apparent from the discussion above, the service management layer, the network slice management layer and the network slice transformation layer may cause a number of determinations to occur and these determinations may result in data that is at various levels of abstraction (e.g., the functional descriptions of the computing function descriptions as compared to the templates and executable scripts of the configuration data). These determinations may also be viewed as a flow for transforming the available computing function definitions into the configuration data. FIG. 5 shows an example of data transformation flow performed by a system for configuring a network slice. The data transformation flow may relate to the results of various steps discussed in connection with FIGS. 4A-4E.

The data transformation flow begins with the available computing function definitions 510. The available computing function definitions 510 may include N different function definitions and may have resulted from the determination at step 453 of FIG. 4C. The N different function definitions may represent the functions that are supported by the available computing resources (e.g., one or more types of data encryption that are supported; one or more threshold of network latencies that can be achieved, etc.)

The data transformation flow continues with computing function definitions that are based on service conditions 520. The computing function definitions that are based on service conditions 520 may include X different function descriptions and may have resulted from the determination at step 433 of FIG. 4B. The X different function descriptions may represent the functions that satisfy the service conditions associated with the network slice.

The data transformation flow continues with a network slice definition 530. The network slice definition 530 may include Y different function descriptions, virtual link information that indicates links between the Y different function descriptions, and a service forwarding graph for the Y different function descriptions. The network slice definition may have resulted from the determination at step 435 of FIG. 4B. The Y different function descriptions may represent the selected functions that will form the basis for configuring the network slice. In other words, the network slice definition indicates that the network slice will be configured based on the Y different function definitions.

The data transformation flow continues with computing function resources 540. The computing function resources 540 may include Z different computing function resources. The computing function resources 540 may have resulted from the determination at step 459 of FIG. 4C. The Z different computing function resources may represent the selected specialized resources or other infrastructure elements that will be configured for the network slice (e.g., eNodeB, HSS, BTS, and the like).

The data transformation flow continues with configuration data 550. The configuration data 550 may include F different templates and G different executable scripts. The configuration data 550 may have resulted from the determination at step 461 of FIG. 4C. The configuration data may represent the data usable to configure computing resources to operate as the one or more computing function resources and/or perform functions of the one or more computing function resources. In other words, the configuration data may be usable to configure the one or more computing function resources.

Figure 6B:
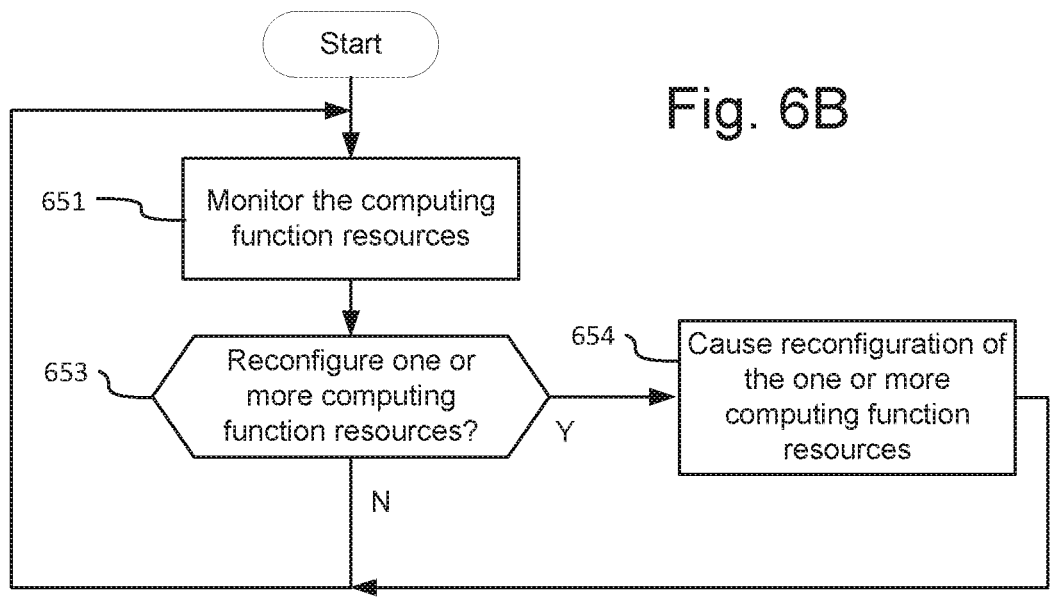

Once the network slice is configured, activated and available to perform the network service, the system may perform various additional processes related to the management of the network slice and the associated computing function resources. FIGS. 6A and 6B provide example methods for managing a network slice and one or more computing function resources after configuration of the network slice.

FIG. 6A may be performed by one or more computing devices configured to provide the network slice management layer 210.

At step 601, the one or more computing devices may monitor the network slice. The monitoring may include, for example, monitoring various conditions of the network slice or other network infrastructure (e.g., network conditions of RAN 350a). These network conditions may include, for example, bandwidth, latency, throughput and other characteristics of the network slice's or the network infrastructure's performance. The monitoring may include monitoring for various changes in a policy or an account associated with the network service. The monitoring may further include monitoring for various requests or commands related to the network slice. Based on the monitored network conditions, policies, accounts, requests and commands, the one or more computing devices may determine to take various actions related to the network slice. Steps 603-608 show a few examples of the types of actions that may be performed.

At step 603, the one or more computing devices may determine whether to redefine the network slice. For example, one of the network conditions may indicate a change in network usage (e.g., a spike in network usage related to the network slice). Based on this change, the one or more computing devices may determine to redefine the network slice (e.g., to increase resources configured for the network slice). As another example, a policy or account may change (e.g., an end-user upgrades to a higher level of QoE) and, based on this change, the one or more computing devices may determine to redefine the network slice. An end-user or operator may transmit a request or command to redefine the network slice and, based on the request or command, the one or more computing devices may determine to redefine the network slice. If the one or more computing devices determine to redefine the network slice, the method may proceed to step 604. If the one or more computing devices determine not to redefine the network slice, the method may proceed to step 605.

At step 604, the one or more computing devices may, based on an updated network slice definition, cause reconfiguration of the network slice. For example, the one or more computing devices may determine an updated network slice definition from the current network slice definition. The determination of the updated network slice definition may result from a process similar to what occurs at steps 423-435 of FIG. 4B, except new or updated service conditions may be processed. The new or updated service conditions may be based on one or more changes to the network conditions, policies or accounts that are being monitored, or based on receipt of a request or command. For example, if a network condition indicated a spike in usage of the network slice, the new or updated service conditions may indicate the increased usage and, accordingly, the updated network slice definition may include additional function descriptions that address the increased usage. Once the updated network slice definition has been determined, the one or more computing devices may perform a process similar to steps 437-447 of FIG. 4B may be performed to cause reconfiguration of the network slice. In connection with reconfiguring the network slice, various steps from FIGS. 4C-4E may be performed by the network slice transformation layer, the computing resource MANO, the computing resource EM, and the computing resources.

At step 605, the one or more computing devices may determine whether to deactivate the network slice. For example, one of the network conditions may indicate a change in network usage (e.g., downturn in network usage related to the network slice). Based on this change, the one or more computing devices may determine to deactivate the network slice (e.g., suspend performance of the network service). As another example, a policy or account indicate a deactivation window (e.g., a policy indicates that the network slice should be deactivated during certain times of the day or days of the week) and, based on this change, the one or more computing devices may determine to deactivate the network slice. An end-user or operator may transmit a request or command to deactivate the network slice and, based on the request or command, the one or more computing devices may determine to deactivate the network slice. If the one or more computing devices determine to deactivate the network slice, the method may proceed to step 606. If the one or more computing devices determine not to deactivate the network slice, the method may proceed to step 607.

At step 606, the one or more computing devices may cause deactivation of the network slice. For example, causing deactivation may include storing an indication of the deactivation, transmitting a signal to the network slice transformation layer that causes deactivation of the one or more computing function resources, and setting a timer to trigger reactivation of the network slice. Upon expiration of the timer, the one or more computing devices may transmit an instruction to activate the network slice (similar to step 445 of FIG. 4B). Causing deactivation of the network slice may cause certain operations for deactivating computing function resources to be performed by the network slice management layer, the computing resource MANO, the computing resource EM, and the computing resources. For example, upon receiving the signal that causes deactivation, the network slice transformation layer may send one or more instructions to deactivate the one or more computing function resources.

At step 607, the one or more computing devices may determine whether to terminate the network slice. For example, one of the network conditions may indicate a change in end-devices that are connected to the network slice (e.g., the last end-device has disconnected from the network slice). Based on this change, the one or more computing devices may determine to terminate the network slice. As another example, a policy or account indicate a termination condition (e.g., a policy or account indicates that the term for the network slice is for 1 or 2 years) and, based on the policy or account, the one or more computing devices may determine to terminate the network slice. An end-user or operator may transmit a request or command to terminate the network slice and, based on the request or command, the one or more computing devices may determine to deactivate the network slice. If the one or more computing devices determine to terminate the network slice, the method may proceed to step 608. If the one or more computing devices determine not to terminate the network slice, the method may proceed back to step 601 to continue monitoring the network slice.

At step 608, the one or more computing devices may cause termination of the network slice. For example, causing termination may include deallocating resources for the network slice and transmitting a signal to the network slice transformation layer that causes termination of the one or more computing function resources. Causing termination of the network slice may cause certain operations for terminating computing function resources to be performed by the network slice management layer, the computing resource MANO, the computing resource EM, and the computing resources. For example, upon receiving the signal that causes termination, the network slice transformation layer may send one or more instructions to terminate the one or more computing function resources. Upon termination, the computing resources that were previously configured as the one or more computing function resources may be released back to the available computing resources.

FIG. 6B may be performed by one or more computing devices configured to provide the network slice transformation layer 215.

At step 651, the one or more computing devices may monitor the computing function resources. The monitoring may include, for example, monitoring the one or more computing function resources that are currently configured for the network slice and the available computing function resources. The monitoring may determine a change has occurred in the computing function resources. Based on the change, the one or more computing devices may determine to take various actions related to the computing function resources. Steps 653 and 654 show an example of the types of actions that may be performed.

At step 653, the one or more computing devices may determine whether to reconfigure one or more computing function resources for the network slice. For example, one of the computing function resources may have crashed or a new computing function resource may have been added to the available computing function resources that is of a higher priority than one of the currently configured computing function resource. Based on this change, the one or more computing devices may determine to reconfigure the one or more computing function resources for the network slice. If the one or more computing devices determine to reconfigure the one or more computing function resources for the network slice, the method may proceed to step 654. If the one or more computing devices determine not to redefine the network slice, the method may proceed to step 651 to continue monitoring the computing function resources.

At step 654, the one or more computing devices may cause reconfiguration of the one or more computing function resources for the network slice. For example, causing reconfiguration may include replacing one of the computing function resources (e.g., a virtual machine configured to operate as an eNodeB) with a new computing function resource (e.g., a physical device configured to operate as eNodeB), adding a new computing function resource (e.g., configuring a virtual machine to operate as a new BTS for the network slice) to those currently configured for the network slice, or removing a computing function resource from those currently configured for the network slice. As part of reconfiguring the one or more computing function resources, a process similar to steps 455-479 of FIG. 4C may be performed to cause reconfiguration of the one or more computing function resources for the network slice. In connection with reconfiguring the one or more computing function resources for the network slice, various steps from FIGS. 4B, 4D and 4E may be performed by the network slice management layer, the computing resource MANO, the computing resource EM, and the computing resources.

Figure 7:
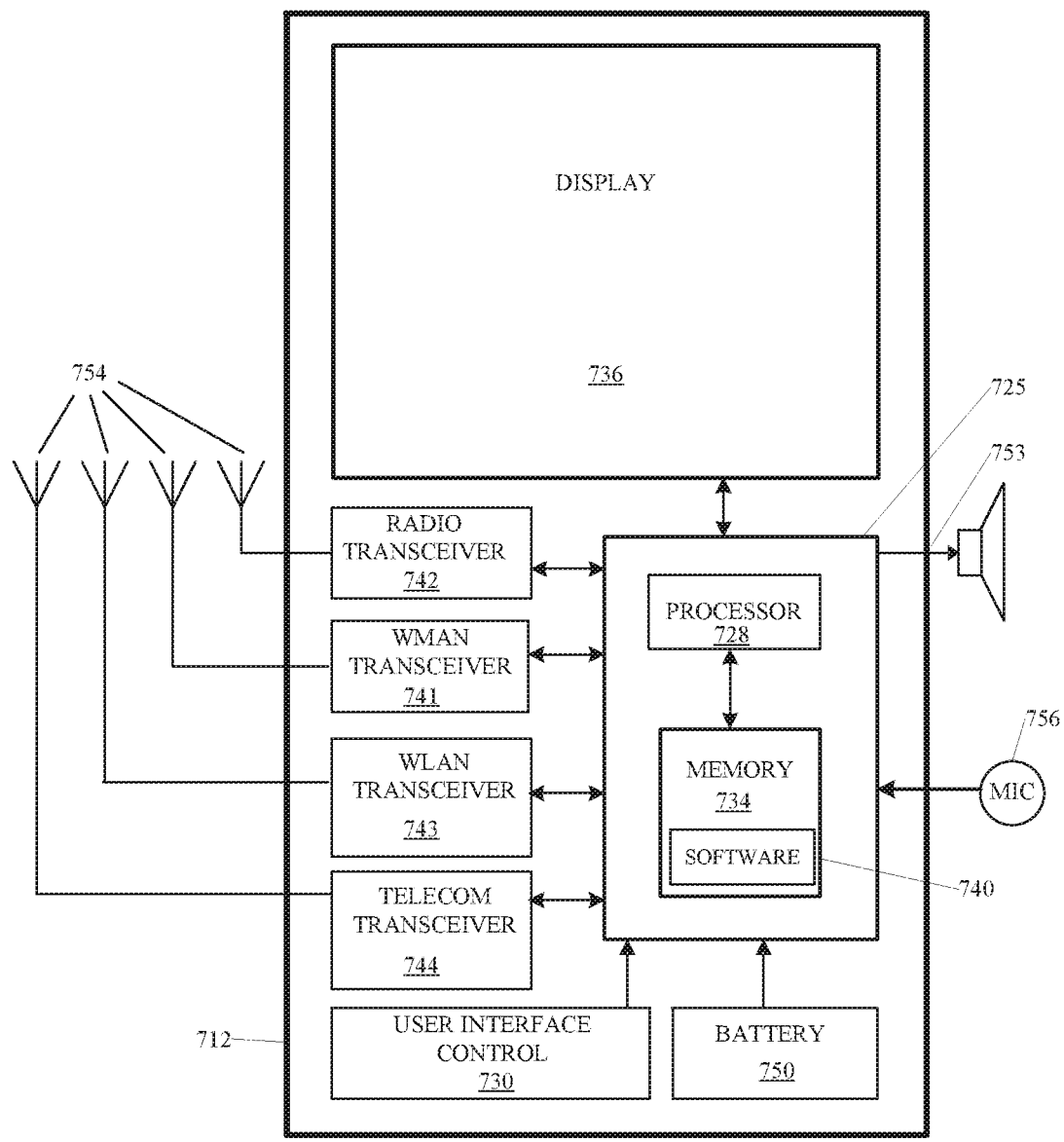
FIG. 7 shows an example apparatus that may be used in a network environment described herein or used to implement one or more aspects described herein.

Any of the method steps, operations, procedures or functions described herein may be implemented using one or more processors and/or one or more memory in combination with machine executable instructions that cause the processors and other components to perform various method steps, described features, or other aspect described herein. FIG. 7 shows an example apparatus, in particular a computing device 712, that may be used in a network environment such as those found in FIGS. 2, 3A and 3B. The computing device 712 may be configured to perform some or all of the functions of any device, station, equipment, points, or the like, found in FIGS. 2, 3A and 3B. Further, the computing device 712 may be configured to perform some or all of the steps discussed in connection with FIGS. 4A-4F and 6. The computing device 712 may be configured to perform any other process, feature or aspect discussed in connection with FIGS. 1-6, or any variation thereof.

The computing device 712 shows just one example of the various types of hardware components that may be present in an apparatus that is configured to implement one or more aspects described in this disclosure. Computing device 712 may include a controller 725. The controller 725 may be connected to a user interface control 730, display 736 and/or other elements as illustrated. Controller 725 may include circuitry, such as for example one or more processors 728 and one or more memory 734 storing software 740. The software 740 may comprise, for example, one or more of the following software options: client software 765, user interface software, server software, etc.

Device 712 may also include a battery 750 or other power supply device, speaker 753, and one or more antennae 754. Device 712 may include user interface circuitry, such as user interface control 730. User interface control 730 may include controllers or adapters, and other circuitry, configured to receive input from or provide output to a keypad, touch screen, voice interface—for example via microphone 756, function keys, joystick, data glove, mouse and the like. The user interface circuitry and user interface software may be configured to facilitate user control of at least some functions of device 712 though use of a display 736. Display 736 may be configured to display at least a portion of a user interface of device 712. Additionally, the display may be configured to facilitate user control of at least some functions of the device (for example, display 736 could be a touch screen).

Software 740 may be stored within memory 734 to provide instructions to processor 728 such that when the instructions are executed, processor 728, device 712 and/or other components of device 712 are caused to perform various processes or methods, such as those described herein. The software may comprise machine executable instructions and data used by processor 728 and other components of computing device 712 may be stored in a storage facility such as memory 734 and/or in hardware logic in an integrated circuit, ASIC, etc. Software may include both applications and operating system software, and may include code segments, instructions, applets, pre-compiled code, compiled code, computer programs, program modules, engines, program logic, and combinations thereof.

Memory 734 may include any of various types of tangible machine-readable storage medium, including one or more of the following types of storage devices: read only memory (ROM) modules, random access memory (RAM) modules, magnetic tape, magnetic discs (for example, a fixed hard disk drive or a removable floppy disk), optical disk (for example, a CD-ROM disc, a CD-RW disc, a DVD disc), flash memory, and EEPROM memory. As used herein (including the claims), a tangible or non-transitory machine-readable storage medium is a physical structure that may be touched by a human. A signal would not by itself constitute a tangible or non-transitory machine-readable storage medium, although other embodiments may include signals or ephemeral versions of instructions executable by one or more processors to carry out one or more of the operations described herein.

As used herein, processor 728 (and any other processor or computer described herein) may include any of various types of processors whether used alone or in combination with executable instructions stored in a memory or other computer-readable storage medium. Processors should be understood to encompass any of various types of computing structures including, but not limited to, one or more microprocessors, special-purpose computer chips, field-programmable gate arrays (FPGAs), controllers, application-specific integrated circuits (ASICs), combinations of hardware/firmware/software, or other special or general-purpose processing circuitry.

As used in this application, the term 'circuitry' may refer to any of the following: (a) hardware-only circuit implementations (such as implementations in only analog and/or digital circuitry) and (b) combinations of hardware circuits and software (and/or firmware), such as (as applicable): (i) a combination of processor(s) or (ii) portions of processor (s)/software (including digital signal processor(s)), software, and memory(ies) that work together to cause an apparatus, such as a mobile phone or server, to perform various functions) and (c) hardware circuits, such as a microprocessor(s) or a portion of a microprocessor(s), that require software or firmware for operation, even if the software or firmware is not physically present.

These examples of 'circuitry' apply to all uses of this term in this application, including in any claims. As an example, as used in this application, the term "circuitry" would also cover an implementation of merely a processor (or multiple processors) or portion of a processor and its (or their) accompanying software and/or firmware. The term "circuitry" would also cover, for example, a baseband integrated circuit or applications processor integrated circuit for a mobile phone or a similar integrated circuit in a server, a cellular network device, or other network device.

Device 712 or its various components may be mobile and be configured to receive, decode and process various types of transmissions including transmissions in Wi-Fi networks according to a wireless local area network (e.g., the IEEE 802.11 WLAN standards 802.11n, 802.11ac, etc.) and/or wireless metro area network (WMAN) standards (e.g., 802.16), through a specific one or more WLAN transceivers 743, one or more WMAN transceivers 741. Additionally or alternatively, device 712 may be configured to receive, decode and process transmissions through various other transceivers, such as FM/AM Radio transceiver 742, and telecommunications transceiver 744 (e.g., cellular network receiver such as CDMA, GSM, 4G LTE, 5G, etc.).

Although the above description of FIG. 7 generally relates to a mobile device, other devices or systems may include the same or similar components and perform the same or similar functions and methods. For example, a computer communicating over a wired network connection (for example, device 340d of FIG. 3A) may include the components or a subset of the components described above, and may be configured to perform the same or similar functions as device 712 and its components. Further access points as described herein may include the components, a subset of the components, or a multiple of the components (e.g., integrated in one or more servers) configured to perform the steps, described herein.

The below table includes an example of a template that, in some instances, may be part of configuration data (e.g., step 461 of FIG. 4C, configuration data 550 of FIG. 5). In practice, a template may, as compared to the below example, be structured differently and include different definitions.

TABLE A

```
<vnfd xsi:type="to_catalog_vnfd" xmlId="VNFDRepresentation_
79032cfb-d511-4b8c-94co-54f2e5ea9def">
    <uuid>79032cfb-d511-4b8c-94cc-54f2e5ea9def</uuid>
    <version>1.0</version>
    <vendor>Vendor</vendor>
    <name>eNodeB</name>
    <description>eNodeB</description>
    <software_version>1.0</software_version>
    <tag_count>0</tag_count>
    <vdu_count>0</vdu_count>
    <virtual_link_count>0</virtual_link_count>
    <dependency_count>0</dependency_count>
    <connection_point xsi:type="to_catalog_cp"
xmlId="CPRepresentation_e6e0002b-24f8-b46f-8672-20601fde3e6b">
```

TABLE A-continued

```
        <description>oam</description>
        <type>oam</type>
        <interface_name>oam</interface_name>
        <uuid>CPRepresentation_CPRepresentation_e6e0002b-24f8-
b46f-8672-20601fde3e6b</uuid>
        <tag_count>0</tag_count>
    </connection_point>
    <connection_point xsi:type="to_catalog_cp"
xmlId="CPRepresentation_4f003256-308a-f39f-14eb-8137d514b0b3">
        <description>S1</description
        <type>S1</type>
        <interface_name>S1</interface_name>
        <uuid>CPRepresentation_CPRepresentation_4f003256-308a-
f39f-14eb-8137d514b0b3</uuid>
        <tag_count>0</tag_count>
    </connection_point>
    <connection_point xsi:type="to_catalog_cp"
xmlId="CPRepresentation_1bfe43bb-f0ff-5ae2-1d5f-14f1eb2426ba">
        <description>S1-MME</description>
        <type>S1-MME</type>
        <interface_name>S1-MME</interface_name>
        <uuid>CPRepresentation_CPRepresentation_1bfe43bb-f0ff-
5ae2-1d5f-14f1eb2426ba</uuid>
        <tag_count>0</tag_count>
    </connection_point>
    <connection_point xsi:type="to_catalog_cp"
xmlId="CPRepresentation_d3971ed2-8321-b273-e549-263cfc3f75b8">
        <description>UEs</description>
        <type>UEs</type>
        <interface_name>UEs</interface_name>
        <uuid>CPRepresentation_CPRepresentation_d3971ed2-8321-
b273-e549-263cfc3f75b8</uuid>
        <tag_count>0</tag_count>
    </connection_point>
    <connection_point_count>4</connection_point_count>
    <manifest_file>od-enb</manifest_file>
    <lifecycle_event xsi:type="to_catalog_lifecycleevent"
xmlId="LifecycleEventRepresentation_2d88fac6-4413-4849-95e5-
8bdbac75dfe7">
        <uuid>2d88fac6-4413-4849-95e5-8bdbac75dfe7</uuid>
        <vnfmOperation xsi:type="to_catalog_vnfmoperation"
xmlId="VnfmOperationRepresentation_15d0e55c-25d1-4544-a986-
b124078af745">
            <uuid>15d0e55c-25d1-4544-a986-b124078af745</uuid>
            <name>Deploy</name>
            <flag>FLOATINGIP_ASSIGN_READY</flag>
        </vnfmOperation>
    </lifecycle_event>
    <lifecycle_event xsi:type="to_catalog_lifecycleevent"
xmlId="LifecycleEventRepresentation_4ff8d9f2-6bf4-4579-9f14-
681ba101b771">
        <uuid>4ff8d9f2-6bf4-4579-9f14-681ba101b771</uuid>
        <vnfmOperation xsi:type="to_catalog_vnfmoperation"
xmlId="VnfmOperationRepresentation_21895720-6b0c-4f98-a86d-
e2f5a5778b5c">
            <uuid>21895720-6b0c-4f98-a86d-e2f5a5778b5c</uuid>
            <name>Install</name>
        </vnfmOperation>
    </lifecycle_event>
    <lifecycle_event xsi:type="to_catalog_lifecycleevent"
xmlId="LifecycleEventRepresentation_d1892423-2625-46d1-a58a-
daa827001489">
        <uuid>d1892423-2625-46d1-a58a-daa827001489</uuid>
        <vnfmOperation xsi:type="to_catalog_vnfmoperation"
xmlId="VnfmOperationRepresentation_d4e83804-49ba-4fb2-8f31-
1b66e2206a26">
            <uuid>d4e83804-49ba-4fb2-8f31-1b66e2206a26</uuid>
            <name>Configure</name>
        </vnfmOperation>
    </lifecycle_event>
    <lifecycle_event xsi:type="to_catalog_lifecycleevent"
xmlId="LifecycleEventRepresentation_6ad8db7f-9810-4f9f-b646-
c38c64b0dbd3">
        <uuid>6ad8db7f-9810-4f9f-b646-o38o64b0dbd3</uuid>
        <vnfmOperation xsi:type="to_catalog_vnfmoperation"
xmlId="VnfmOperationRepresentation_5d2591d3-0438-4504-9369-
14853540476c">
            <uuid>5d2591d3-0438-4504-9369-14853540476c</uuid>
            <name>Start</name>
            <flag>ACTIVE</flag>
```

TABLE A-continued

```
        </vnfmOperation>
      </lifecycle_event>
      <lifecycle_event xsi:type="to_catalog_lifecycleevent"
xmlId="LifecycleEventRepresentation_f5bcbb59-a416-451f-bf6d-
0e734984bb45">
        <uuid>f5bcbb59-a416-451f-bf6d-0e734984bb45</uuid>
        <vnfmOperation xsi:type="to_catalog_vnfmoperation"
xmlId="VnfmOperationRepresentation_027611o5-6c63-4968-83ac-
9494d1bc2b62">
          <uuid>027611c5-6c63-4959-83ac-9494d1bc2b62</uuid>
          <name>Stop</name>
        </vnfmOperation>
      </lifecycle_event>
      <lifecycle_event xsi:type="to_catalog_lifecycleevent"
xmlId="LifecycleEventRepresentation_2d0acefb-a010-4969-90d0-
8b5c882ec931">
        <uuid>2d0acefb-a010-4969-90d0-8b5c882ec931</uuid>
        <vnfmOperation xsi:type="to_catalog_vnfmoperation"
xmlId="VnfmOperationRepresentation_b7c1423d-a626-4bbe-a0af-
f8cbf434ce52">
          <uuid>b7c1423d-a626-4bbe-a0af-f8cbf434ce52</uuid>
          <name>Unistall</name>
        </vnfmOperation>
      </lifecycle_event>
      <lifecycle_event xsi:type="to_catalog_lifecycleevent"
xmlId="LifecycleEventRepresentation_6bb92rb9-e7a8-487e-a7cb-
418d89c6cb7f">
        <uuid>6bb92fb9-e7a8-487e-a7cb-418d89c6cb7f</uuid>
        <vnfmOperation xsi:type="to_catalog_vnfmoperation"
xmlId="VnfmOperationRepresentation_e363cc00-93b2-45e6-acfd-
bba35973ea16">
          <uuid>e363cc00-93b2-45e6-acfd-bba35973ea16</uuid>
          <name>Undeploy</name>
          <flag>TERMINATED</flag>
        </vnfmOperation>
      </lifecycle_event>
    </vnfd>
```

Although specific examples of carrying out the invention have been described, there are numerous variations and permutations of the above-described systems and methods that are contained within the spirit and scope of the invention as set forth in the appended claims.

We claim:

1. A method comprising:
   receiving a request for a network service;
   determining, by one or more computing devices, at least one service condition associated with the network service;
   determining, by the one or more computing devices and based on the at least one service condition, one or more computing function definitions from a plurality of available computing function definitions;
   determining, by the one or more computing devices and based on the one or more computing function definitions, a network slice definition, wherein the network slice definition indicates that the network slice will be configured based on at least a first computing function definition of the one or more computing function definitions;
   determining one or more computing function resources, by the one or more computing devices and based on the network slice definition and mapping data from a knowledge base that associates computing function definitions to computing function resources and that is created by at least one of: data entry, a deterministic algorithm and machine learning;
   determining, by the one or more computing devices, configuration data that is usable to configure the one or more computing function resources;
   causing, based on the configuration data, configuration of the one or more computing function resources to enable performance of a function associated with the one or more computing function resources; and
   executing, as part of performing the network service via the network slice, the function associated with the one or more computing function resources.

2. The method of claim 1, wherein the configuration data comprises a computing function resource template and an executable script.

3. The method of claim 1, wherein the function associated with the one or more computing function resources is a function associated with an Evolved Node B (eNodeB), a Mobility Management Entity (MME), a serving gateway (S-GW), a Home Subscriber Server (HSS), or a base transceiver station (BTS).

4. The method of claim 1, wherein executing the function associated with the one or more computing function resources is performed by one or more virtual machines.

5. The method of claim 1, further comprising:
   transmitting, to one or more second computing devices, a request for an inventory of available computing function resources, wherein the one or more second computing devices are operating as a virtualization management and orchestration;
   receiving, from the one or more second computing devices, an indication of the inventory of available computing function resources; and
   wherein determining the one or more computing function definitions from the plurality of available computing function definitions is performed based on the indication of the inventory of available computing function resources.

6. The method of claim 1, wherein causing the configuration of the one or more computing function resources is performed by:
   transmitting, to one or more second computing devices, a first instruction to instantiate the one or more computing function resources, wherein the one or more second computing devices are operating as a virtualization management and orchestration;
   receiving, from the one or more second computing devices, a first indication that the one or more computing function resources have been instantiated;
   transmitting, to one or more third computing devices, a second instruction to configure each of the one or more computing function resources, wherein the one or more third computing devices are operating as an element manager;
   receiving, from the one or more third computing devices, a second indication that each of the one or more computing function resources has been configured; and
   transmitting, to the one or more third computing devices, a third instruction to activate the one or more computing function resources for performing the network service via the network slice.

7. An apparatus comprising:
   one or more processors; and
   memory storing executable instructions that, when executed by the one or more processors, cause the apparatus to at least:
   receive a request for a network service;
   determine at least one service condition associated with the network service;
   determine, based on the at least one service condition, one or more computing function definitions from a plurality of available computing function definitions;
   determine, based on the one or more computing function definitions, a network slice definition, wherein the network slice definition indicates that the network slice will be configured based on at least a first computing function definition of the one or more computing function definitions;

determine one or more computing function resources, based on the network slice definition and mapping data from a knowledge base that associates computing function definitions to computing function resources and that is created by at least one of: data entry, a deterministic algorithm and machine learning;

determine configuration data that is usable to configure the one or more computing function resources;

cause, based on the configuration data, configuration of the one or more computing function resources to enable performance of a function associated with the one or more computing function resources; and execute, as part of performing the network service via the network slice, the function associated with the one or more computing function resources.

8. The apparatus of claim 7, wherein the configuration data comprises a computing function resource template and an executable script.

9. The apparatus of claim 7, wherein the function associated with the one or more computing function resources is a function associated with an Evolved Node B (eNodeB), a Mobility Management Entity (MME), a serving gateway (S-GW), a Home Subscriber Server (HSS), or a base transceiver station (BTS).

10. The apparatus of claim 7, wherein causing the apparatus to execute the function associated with the one or more computing function resources is performed by causing the apparatus to execute one or more virtual machines.

11. The apparatus of claim 7, wherein the executable instructions, when executed by the one or more processors, cause the apparatus to:

transmit, to one or more first computing devices, a request for an inventory of available computing function resources, wherein the one or more second computing devices are operating as a virtualization management and orchestration;

receive, from the one or more second computing devices, an indication of the inventory of available computing function resources; and wherein determining the one or more computing function definitions from the plurality of available computing function definitions is performed based on the indication of the inventory of available computing function resources.

12. The apparatus of claim 7, wherein causing the apparatus to cause the configuration of the one or more computing function resources is performed by causing the apparatus to:

transmit, to one or more first computing devices operating as a virtualization management and orchestration, a first instruction to instantiate the one or more computing function resources;

receive, from the one or more first computing devices, a first indication that the one or more computing function resources have been instantiated;

transmit, to one or more second computing devices operating as an element manager, a second instruction to configure each of the one or more computing function resources;

receive, from the one or more second computing devices, a second indication that each of the one or more computing function resources has been configured; and transmit, to the one or more second computing devices, a third instruction to activate the one or more computing function resources for performing the network service via the network slice.

* * * * *